US012105909B2

(12) United States Patent
Chen et al.

(10) Patent No.: US 12,105,909 B2
(45) Date of Patent: Oct. 1, 2024

(54) METHOD FOR DRIVING TOUCH-AND-DISPLAY DEVICE, DRIVING CIRCUIT, AND TOUCH-AND-DISPLAY DEVICE PRELIMINARY CLASS

(71) Applicant: NOVATEK MICROELECTRONICS CORP., Taiwan (CN)

(72) Inventors: Hung-Hsiang Chen, Hsinchu (TW); Chang-Hung Chen, Zhubei (TW); Huang-Chin Tang, Zhubei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 18/112,642

(22) Filed: Feb. 22, 2023

(65) Prior Publication Data

US 2023/0251739 A1 Aug. 10, 2023

Related U.S. Application Data

(63) Continuation of application No. 17/313,796, filed on May 6, 2021, now Pat. No. 11,609,657.

(Continued)

(51) Int. Cl.
*G06F 3/041* (2006.01)
*G09G 3/3225* (2016.01)

(52) U.S. Cl.
CPC ....... *G06F 3/04166* (2019.05); *G09G 3/3225* (2013.01); *G09G 2310/08* (2013.01)

(58) Field of Classification Search
CPC ............ G06F 3/04184; G06F 3/04166; G09G 3/3225; G09G 3/3233; G09G 2310/08
See application file for complete search history.

(56) References Cited

U.S. PATENT DOCUMENTS 9,442,615 B2   9/2016 Reynolds
9,519,377 B2  12/2016 Ji
(Continued)

FOREIGN PATENT DOCUMENTS

CN   106323633 A   1/2017
CN   106339128 A   1/2017
(Continued)

OTHER PUBLICATIONS

Notice of Allowance, U.S. Appl. No. 17/313,810, mailed Jan. 31, 2022.

(Continued)

*Primary Examiner* — Dennis P Joseph
(74) *Attorney, Agent, or Firm* — MARSHALL, GERSTEIN & BORUN LLP

(57) ABSTRACT

The disclosure provides a method for driving an OLED touch-and-display device, a driving circuit, and an OLED touch-and-display device. The method includes: dividing each display frame into at least one display period and at least one touch detection period which are alternated; during each display period, generating sequentially-shifted gate driving signals and sequentially-shifted light-emission control signals, and sequentially applying the sequentially-shifted gate driving signals to at least a part of gate driving lines, and sequentially applying the sequentially-shifted light-emission control signals to at least a part of light-emission control lines; during each touch detection period, suspending generation of sequentially-shifted gate driving signals without suspending generation of sequentially-shifted light-emission control signals; and during a period when a gate driving signal for each row of pixels is of active level, maintaining a light-emission control signal for the row of pixels at inactive level.

17 Claims, 12 Drawing Sheets

Related U.S. Application Data

(60) Provisional application No. 63/151,049, filed on Feb. 18, 2021, provisional application No. 63/021,663, filed on May 7, 2020.

(56) References Cited

U.S. PATENT DOCUMENTS

| | | |
|---|---|---|
| 9,640,121 B2 | 5/2017 | Munechika |
| 2015/0221255 A1 | 8/2015 | Qing et al. |
| 2015/0279276 A1 | 10/2015 | Xu |
| 2015/0364083 A1 | 12/2015 | Jeon |
| 2018/0239488 A1 | 8/2018 | Lin et al. |
| 2018/0350286 A1 | 12/2018 | Lee et al. |
| 2019/0025965 A1 | 1/2019 | Yang et al. |
| 2019/0220645 A1 | 7/2019 | Ding et al. |
| 2021/0407379 A1* | 12/2021 | Yang ........................ G06F 3/042 |

FOREIGN PATENT DOCUMENTS

| | | |
|---|---|---|
| CN | 107885400 A | 4/2018 |
| CN | 108459755 A | 8/2018 |
| CN | 106601173 B | 12/2019 |
| TW | 201220265 A | 5/2012 |
| TW | 201913330 A | 4/2019 |

OTHER PUBLICATIONS

Notice of Allowance, U.S. Appl. No. 17/313,818, mailed Apr. 1, 2022.

Non-final Office Action, U.S. Appl. No. 17/313,796, mailed Apr. 25, 2022.

Final Office Action, U.S. Appl. No. 17/313,796, mailed Aug. 3, 2022.

* cited by examiner

METHOD FOR DRIVING TOUCH-AND-DISPLAY DEVICE, DRIVING CIRCUIT, AND TOUCH-AND-DISPLAY DEVICE PRELIMINARY CLASS

CROSS-REFERENCE TO RELATED APPLICATION(S)

This application is a continuation of U.S. application Ser. No. 17/313,796, filed on May 6, 2021, which claims the priority to and benefits of U.S. provisional Application No. 63/021,663 filed on May 7, 2020, and U.S. Provisional Application No. 63/151,049 filed on Feb. 18, 2021 in the United States Patent and Trademark Office, the disclosure of which is incorporated by reference herein in its entirety.

TECHNICAL FIELD

The disclosure relates to a technical field of touch screens, and in particular to a method for driving a touch-and-display device, a driving circuit and a touch-and-display device.

BACKGROUND

In recent years, technologies of touch sensing have developed rapidly, and many consumer electronic products such as mobile phones, satellite navigation systems, tablet computers, personal digital assistants (PDA) and notebook computers have built-in touch functions. In the above-mentioned various electronic products, the region of the display panel is endowed with touch sensing function, that is, a display panel with simple display function is designed into a touch-and-display panel with both display and touch sensing functions. According to the different structural designs of a touch panel (touch screen or touch sensitive layer), the touch panel can be generally divided into out-cell or in-cell/on-cell touch panel. The out-cell touch panel is a combination of independent touch panel and general display panel, while the in-cell/on-cell touch panel directly sets the touch panel inside or outside the substrate in the display panel. Compared with the out-cell touch panel, the in-cell/on-cell touch panel has thinner thickness and higher light transmittance.

The touch panel is used for touch sensing operation, that is, users can touch the panel with fingers or other objects to perform various functions. The touch sensing operation of the touch panel may be interfered by the display operation of the display panel. Therefore, how to reduce the interference caused by the display operation of the display panel when the touch panel performs the touch sensing operation has become the goal of the industry.

SUMMARY

According to an aspect of the present disclosure, there is provided a method for driving an OLED touch-and-display device, the OLED touch-and-display device including a display panel including a plurality of rows of pixels, a plurality of gate driving lines (GL), and a plurality of light-emission control lines (EM) in one-to-one correspondence, wherein the method comprises: dividing each display frame into at least one display period and at least one touch detection period which are alternated; during each display period, generating sequentially-shifted gate driving signals and sequentially-shifted light-emission control signals, and sequentially applying the sequentially-shifted gate driving signals to at least a part of gate driving lines of the plurality of gate driving lines, and sequentially applying the sequentially-shifted light-emission control signals to at least a part of light-emission control lines of the plurality of light-emission control lines; during each touch detection period, suspending generation of sequentially-shifted gate driving signals without suspending generation of sequentially-shifted light-emission control signals; and during a period when a gate driving signal applied to a gate driving line corresponding to each row of pixels is of active level, maintaining a light-emission control signal applied to a light-emission control line corresponding to the row of pixels at inactive level.

According to another aspect of the present disclosure, there is also provided a driving circuit for a display panel in an OLED touch-and-display device, the display panel including a plurality of rows of pixels, a plurality of gate driving lines (GL), and a plurality of light-emission control lines (EM) in one-to-one correspondence, and. The driving circuit can include various drivers, and is designed to execute the method as described above, so that the display and touch detection can be driven in a time-division manner, and the light-emission control signal and gate driving signal for each row of pixels can meet the preset timing relationship, and the light-emission time lengths of all rows of pixels are basically equal, thereby making the display luminance of the display panel uniform, so as to improve the display quality.

According to another aspect of the present disclosure, there is also provided an OLED touch-and-display device, which includes a display panel including a plurality of rows of pixels, a plurality of gate driving lines (GL), and a plurality of light-emission control lines (EM) in one-to-one correspondence; a touch sensitive layer and a touch controller; and the driving circuit for driving the display panel. The driving circuit can include various drivers, and is designed to execute the method as described above, so that the display and touch detection can be driven in a time-division manner, and the light-emission control signal and gate driving signal for each row of pixels can meet the preset timing relationship, and the light-emission time lengths of all rows of pixels are basically equal, thereby making the display luminance of the display panel uniform, so as to improve the display quality.

According to the driving method, driving circuit and the OLED touch-and-display device, the touch detection operation and display operation can be driven in a time-division manner, so that noise interference from display driving operation does not exist during touch detection operation, the touch detection operation does not take a long time, and therefore power can be saved. In addition, in the case where touch detection operation and display operation are driven in a time-division manner, there is no need to consider the timing and frequency of various signals related to display driving operation when selecting the frequency of the driving signal for touch detection operation, so there can be more selectable frequencies to combat other noise sources. In addition, the light-emission time lengths of respective rows of pixels can be approximately the same, thereby making the display luminance of the display panel uniform, so as to improve the display effect. In addition, when the generation of sequentially-shifted gate driving signals is suspended without suspending the generation of sequentially-shifted light-emission control signals during the touch detection period, the timing of the light-emission control signal and the gate driving signal for the same row of pixels can be ensured, for example, in a case where the time length of a display frame is not changed, the preset timing relationship between the gate driving signal and light-emission control signal for each row of pixels can be ensured by appropriately setting the leading amount of the starting point of inactive level (i.e., the inactive level pulse or the first inactive level pulse) of the light-emission control signal relative to the starting point of active level (i.e., the active level pulse) of the gate driving signal for the first row of pixels, therefore, the timing of the light-emission control signal and the gate driving signal for each row of pixels will not be in disorder.

BRIEF DESCRIPTION OF THE DRAWINGS

The accompanying drawings are intended to provide a further understanding of the embodiments of the disclosure and constitute a part of the specification, and together with the embodiments of the disclosure, serve to explain the disclosure, and do not constitute a limitation on the disclosure. In the drawings, the same reference numerals generally represent the same/similar components or steps.

DETAILED DESCRIPTION

Figure 1:
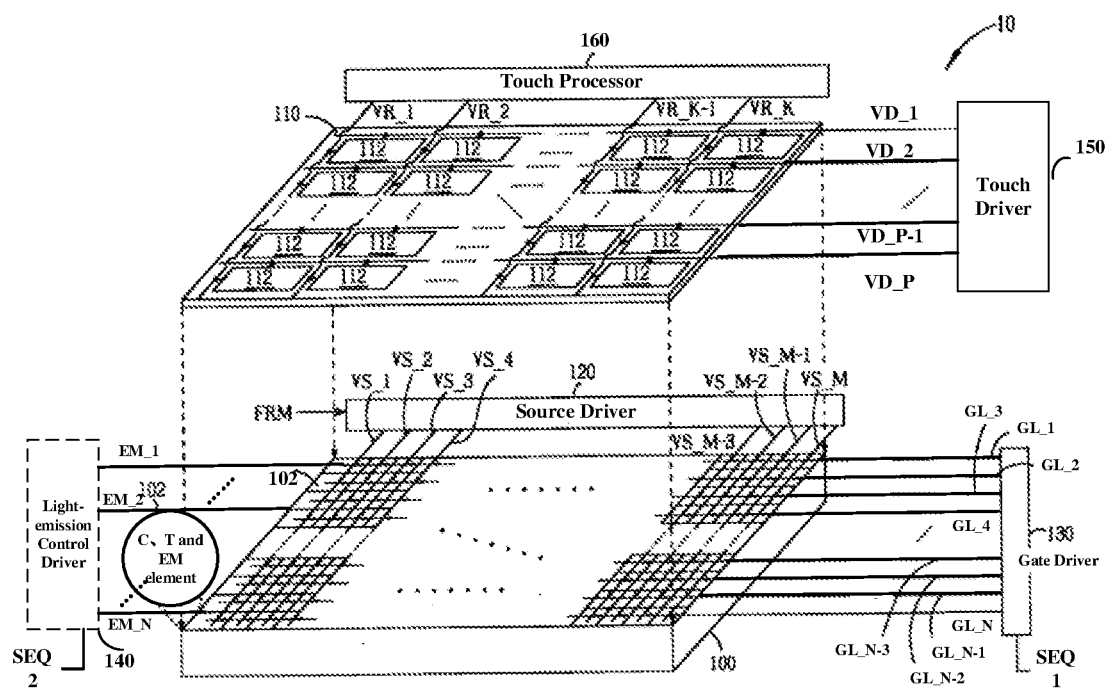
FIG. 1 is a schematic diagram of a touch-and-display device according to an embodiment of the present disclosure.

The word "coupled (or connected)" as used throughout this disclosure (including the claims) may refer to any direct or indirect connection means. For example, if it is described that the first device is coupled (or connected) to the second device, it should be interpreted that the first device can be directly connected to the second device, or the first device can be indirectly connected to the second device through other devices or some connection means. The terms "first" and "second" mentioned in the whole specification of this disclosure (including the claims) are used to name elements or distinguish different embodiments, but are not used to limit the upper limit or lower limit of the number of elements or the order of elements. In addition, wherever possible, elements/components/steps using the same reference numerals in the drawings and embodiments represent the same or similar parts. Elements/components/steps using the same reference numerals or using the same terms in different embodiments can refer to the relevant descriptions. An expression used in the singular may encompass the expression of the plural, and an expression used in the plural may also encompass the expression of the singular, unless it has been clearly defined in the context.

FIG. 1 is a schematic diagram of a touch-and-display device 10 according to an embodiment of the present disclosure.

Referring to FIG. 1, the touch-and-display device 10 includes a display panel 100, a touch sensitive layer 110, a source driver 120, a gate driver 130, a light-emission control driver 140 (which may not be provided depending on the circuit structure of the pixel unit), a touch driver 150, and a touch processor 160 (the touch driver 150 and the touch processor 160 may be collectively referred to as a touch controller). Although each driver for the display panel is shown separately in FIG. 1, as an example, respective drivers can be integrated in one circuit as a driving circuit (e.g., a driving IC), and the driving circuit can also include various computing processing functions, and each module for the touch sensitive layer (e.g., a touch driver and a touch processor) can also be integrated in one module.

The display panel 100 includes pixel units 102 arranged in a two-dimensional matrix (which may be used interchangeably with "pixel"; hereinafter), and therefore includes a plurality of gate driving lines, a plurality of data lines (source lines) arranged perpendicularly to the gate lines, and optionally a plurality of light-emission control lines (for example, in the case of adopting the circuit structure shown in FIG. 2A for the pixel unit). The pixel unit 102 includes a circuit composed of one or more capacitor, a switching element (for example, TFT), and a light-emission element (for example, an Organic Light-emission Diode (OLED)). Similarly, the touch sensitive layer 110 also includes touch sensitive cells 112 arranged in a two-dimensional matrix, thus including a plurality of touch driving lines and a plurality of touch sensing lines.

The source driver 120 generates source driving signals VS_1 to VS_M according to an image signal FRM to be displayed, so as to indicate the color intensity of pixel units 102 through data lines. The gate driver 130 sequentially generates gate driving signals GL_1-GL_N according to a timing signal SEQ1 to indicate the update timing of the pixel units 102, that is, for each row of pixels connected by each gate driving line, switching elements which are in the row of pixels and which are corresponding to the writing of data are turned on according to a gate driving signal applied to the gate driving line, so that data can be written into the row of pixels through the data lines. M and N are both integers greater than or equal to 1.

Figure 2A:
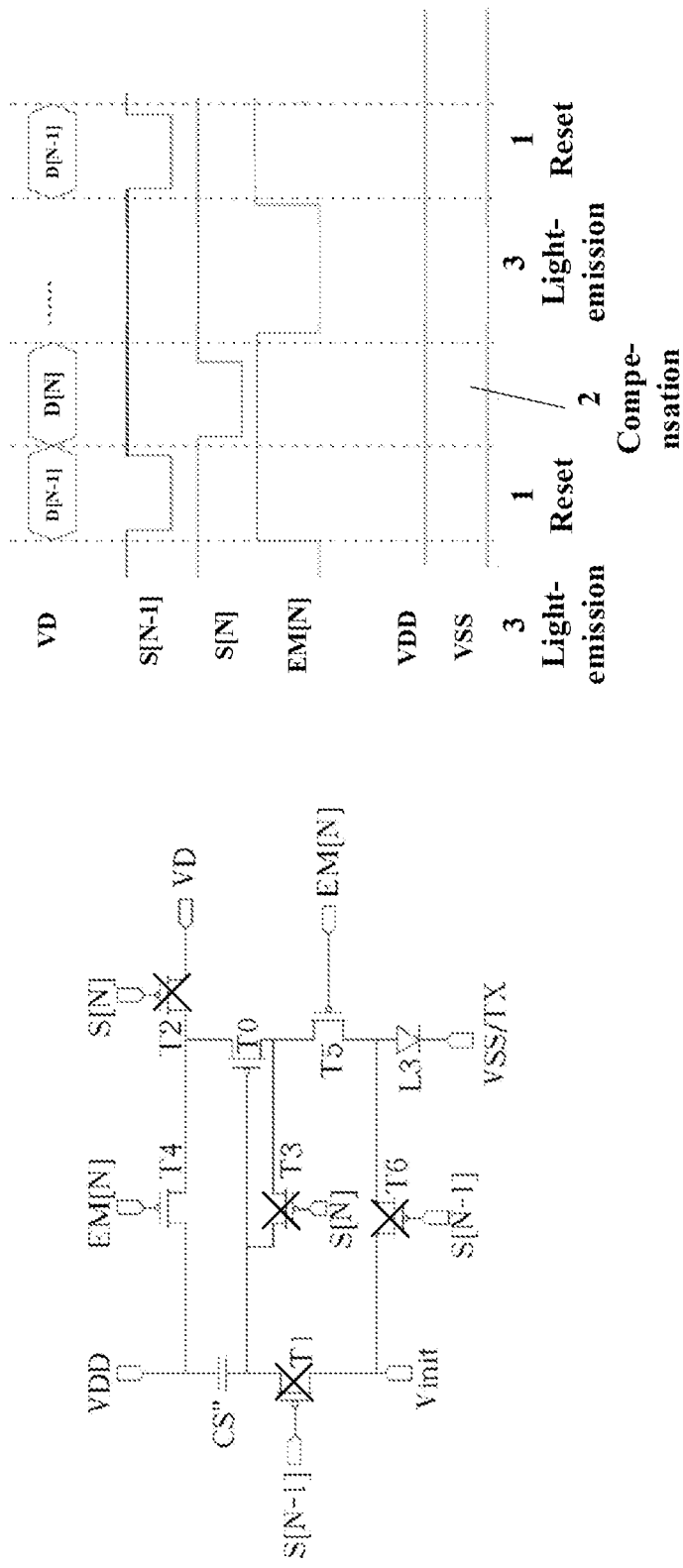
FIG. 2A shows a circuit structure diagram of a pixel unit.

Meanwhile, when the pixel unit is, for example, a pixel unit as shown in FIG. 2A, the touch-and-display device 10 should further include a light-emission control driver 140, which sequentially generates light-emission control signals EM_1 to EM_N according to a timing signal SEQ2 to indicate the light-emission timing of the pixel units 102. For each row of pixels, the gate driving signal and the light-emission control signal are in one-to-one correspondence. For each row of pixels connected to each light-emission control line, light-emission elements in the row of pixels emit light according to a light-emission control signal applied to the light-emission control line.

Meanwhile, the touch driver 150 generates a plurality of driving signals VD_1-VD_P to be applied to the touch driving lines for triggering the touch sensitive cells 112. The triggered touch sensitive cells 112 generates sensing signals (touch detection signals) VR_1 to VR_K. Since touching each touch sensitive cell 112 will change the capacitance or resistance value of the touch sensitive cell 112 (depending on whether the touch sensitive cell 112 is a capacitive or resistive sensitive cell), touch detection signals generated by the touched touch sensitive cells 112 are different from touch detection signals generated by the untouched touch sensitive cells 112. In this way, the touch processor 160 can determine the position of the touched touch sensitive cells 112 according to the change of the touch detection signals VR_1 to VR_K, where K and P are both integers greater than or equal to 1.

It should be noted that the touch-and-display device 10 can be an out-cell touch-and-display device or an in-cell/on-cell touch-and-display device, which is not limited by this disclosure. In addition, because the resolution requirement of the touch sensitive layer 110 is lower than that of the display panel 100, in order to save costs, the laying density of the touch sensitive cells 112 is lower than that of the pixel units 102.

Figure 2B:
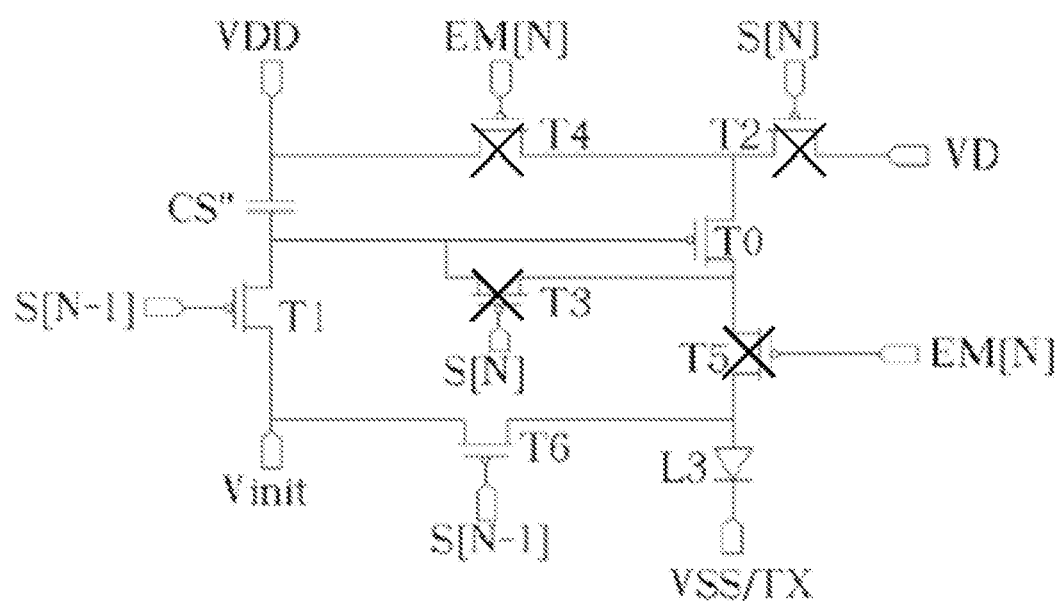
FIGS. 2B-2D show schematic diagrams of working process of the pixel unit in FIG. 2A.
Figure 2C:
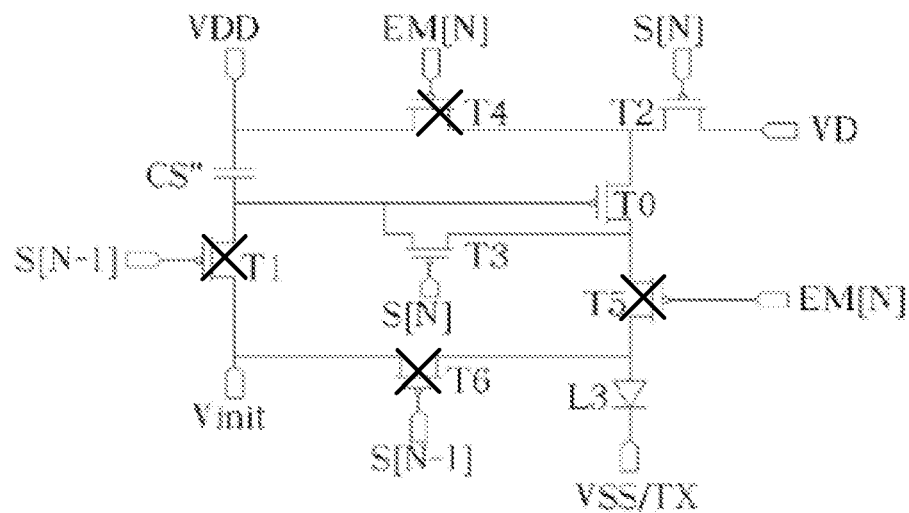
Figure 2D:
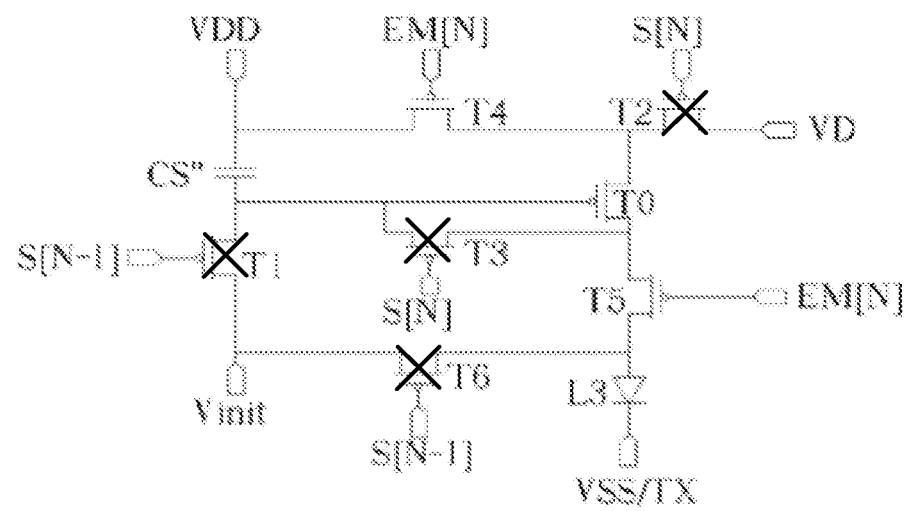

In a specific example, the circuit structure of the pixel unit 102 may be as shown in FIG. 2A, and the working process as shown in FIGS. 2B-D correspondingly.

FIG. 2A shows an exemplary circuit structure diagram of a pixel unit, and FIGS. 2B-D show schematic diagrams of the working process of the pixel unit. The pixel unit has a 7T1C structure with compensation function, which is composed of 7 TFT and 1 storage capacitor. However, it should be understood that pixel units of other structure with compensation function can also be used, for example, similar structures include 6T1C, 5T2C, etc. Alternatively, the pixel unit may also be a pixel unit having a structure without compensation function, such as 2T1C.

FIGS. 2B-D respectively show three stages of reset (1), compensation (2) and light-emission (3) of the working process of the pixel unit, in which the threshold voltage Vth of the switching element such as TFT is stored in the gate-source voltage Vgs first in the compensation stage, and the influence of Vth is counteracted by Vgs-Vth in the light-emission stage, thereby improving the current consistency in the circuit of the pixel unit.

In FIGS. 2A-D, EM[N] represents the light-emission control signal for current row of pixels (i.e., one of the signals EM_1-EM_N from the light-emission control lines in FIG. 1), and S[N] and S[N-1] respectively represent the gate driving signals for current row of pixels and previous row of pixels (i.e., two adjacent signals GL_1-GL_N from the gate driving lines in FIG. 1). In FIGS. 2A-D, low level of EM[N] and S[N] is regarded as active level, but the present disclosure is not limited to this, and active level of EM[N] and S[N] can be changed according to different specific circuits.

In the reset stage (1), as shown in FIG. 2B, the scan signal (gate driving signal) S[N] turns on the transistor T1 to pull the gate voltage of the driving transistor T0 to a lower level Vinit, so that the gate voltage can be compensated in the subsequent stage. It should be noted that the reset stage can be regarded as the end point the previous scanning cycle, and the display data VD outputs the previous piece of data D[N-1] at this time.

In the compensation stage (2), as shown in FIG. 2C, the display data VD is changed to current piece of data D[N], and the scan signal S[N] turns on the transistor T2 to write the data D[N] into the source voltage of the driving transistor T0. At this time, the transistor T3 is turned on, and the driving transistor T0 is connected in a diode-connected manner, so as to find out the threshold voltage Vth of the driving transistor T0 and eliminate the influence of the threshold voltage Vth on the luminance of the organic light-emission diode (OLED) L3, that is, compensate the luminance of the organic light-emission diode (OLED) L3.

Next, in the light-emission stage (3), as shown in FIG. 2D, the light-emission control signal EM[N] turns on the transistors T4 and T5, so that the drain current of the driving transistor T0 passes through the organic light-emission diode (OLED) L3, thereby controlling the organic light-emission diode (OLED) L3 to emit light.

In many OLED touch-and-display devices, display and touch detection are driven simultaneously. During display driving, the touch driver continuously outputs touch driving signals to a plurality of touch sensitive cells on the touch sensitive layer, and the touch processor acquires touch detection signals from the touch sensitive cells for touch detection. The touch driver and the touch processor can also be integrated into one circuit or be the same circuit. The touch sensitive cells on the touch sensitive layer can be formed based on self-capacitance and mutual-capacitance technology, and accordingly appropriate driving and sensing manners can be set, which are well known in the art, so the specific working process of touch detection will not be described here.

When display and touch detection are driven simultaneously, display and touch detection can be driven synchronously or asynchronously. For example, display and touch detection can be driven completely independently, and there is no correlation between their timings, which corresponds to the case of asynchronous driving. As another example, various timing signals for the display panel (such as VSYNC, HSYNC, GSTV, EMSTV, EMCK, etc.) can be used to generate the touch driving signals, which corresponds to the case of synchronous driving.

Figure 3:
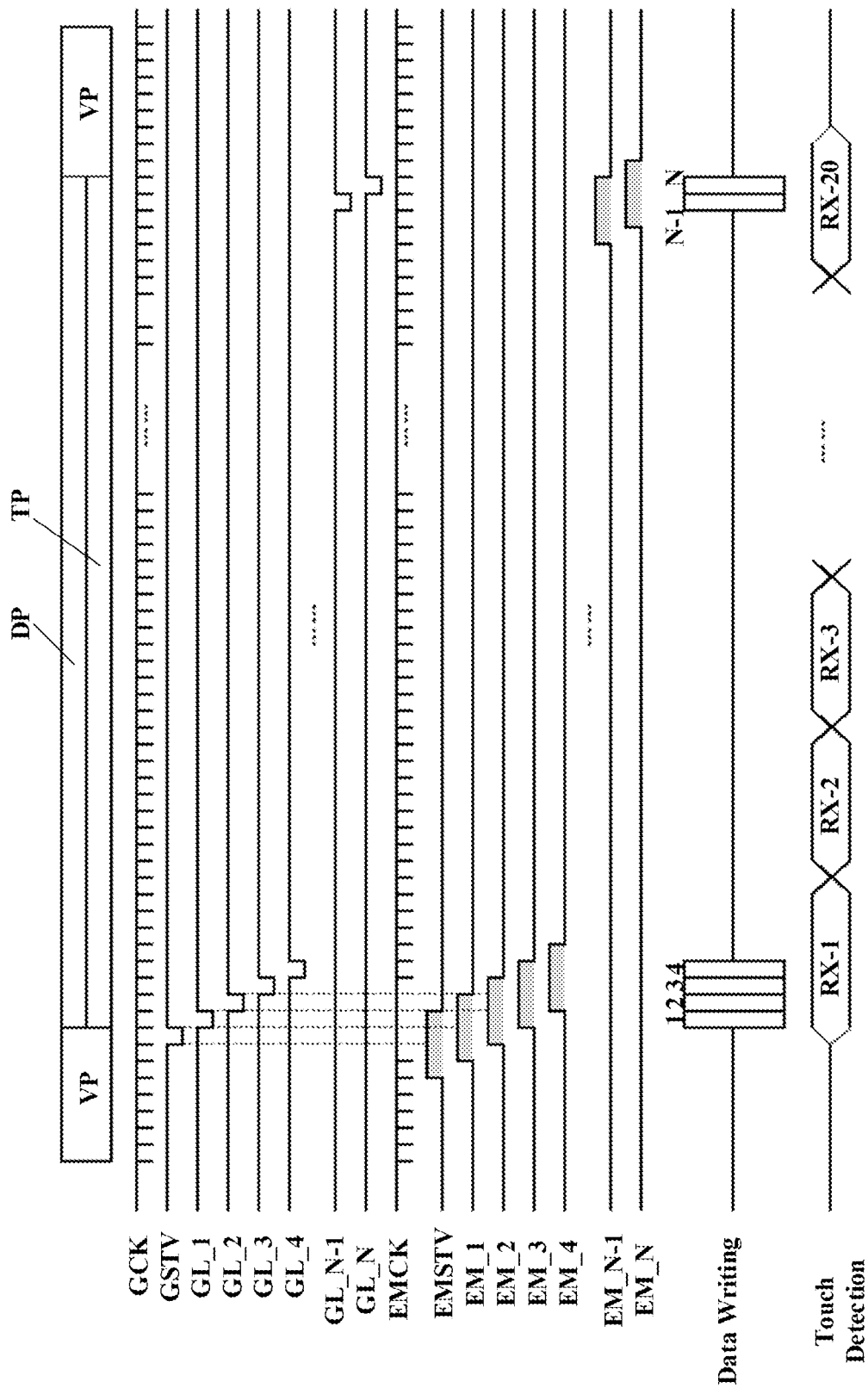
FIG. 3 shows a schematic timing diagram related to signals generated by various drivers in the touch-and-display device.

FIG. 3 shows a timing chart related to various signals generated by each driver in the OLED touch-and-display device (taking the structure of the pixel unit shown in FIG. 2A as an example, it is also applicable to pixel units based on other structures). In FIG. 3, display and touch detection are driven simultaneously, and DP is used to represent display period, TP is used to represent touch detection period, and VP is used to represent invalid periods of each display frame.

As shown in FIG. 3, the gate driver can sequentially generate gate driving signals GL_1-GL_N according to a timing signal SEQ1 (including a first clock signal (GCK) and a first start signal (GSTV)), so as to transmit these signals to each row of pixels on the display panel (actually switching elements in pixel units). Similarly, the light-emission control driver can sequentially generate light-emission control signals EM_1 to EM_n according to another timing signal SEQ2 (including a second clock signal (EMCK) and a second start signal (EMSTV)), so as to transmit these signals to each row of pixels on the display panel respectively. In this example, active level pulse width of GSTV is equal to one clock cycle of the first clock signal (GCK), so each gate driving signal GL_1-GL_N is a pulse signal generated by shifting GSTV, and its active level pulse width is also equal to one clock cycle of the first clock signal (GCK), while inactive level pulse width of EMSTV is approximately equal to four clock cycles of the second clock signal (EMCK), therefore, each light-emission control signal EM_1-EM_N output to the light-emission control lines is a pulse signal generated by shifting EMSTV, and its inactive level pulse width is also approximately equal to four clock cycles, and the first clock cycle of the first clock signal and the second clock cycle of the second clock signal are equal.

The time lengths of the gate driving signal and the light-emission control signal are only exemplary, and other suitable time lengths can be selected, as long as the preset timing relationship of the gate driving signal and the light-emission control signal is satisfied. For each row of pixels, the gate driving signal and light-emission control signal applied to the gate driving line and light-emission control line corresponding to the row of pixels (hereinafter also referred to as the gate driving signal and/or the light-emission control signal for each row of pixels) need to satisfy a specific preset timing relationship. For example, during the period when the gate driving signal is of active level, the light-emission control signal needs to maintain at inactive level, and in the case of the circuit structure of the pixel unit shown in FIG. 2A, in the reset stage of the working process of the circuit in the pixel unit (during the active level of the gate driving signal for the previous row of pixels), the light-emission control signal should also maintain at inactive level, and the light-emission control signal can be changed to active level after a period of time after the gate driving signal becomes inactive level.

In the embodiment of the present disclosure, among all the switching elements in each pixel unit included in the display panel, the low level serves as active level and the high level serves as inactive level of the switching elements, that is, the low level can turn on the switching elements in the pixel unit, while the high level can turn off the switching elements in the pixel unit. Of course, depending on the type of switching elements, the low level can be regarded as inactive level of the switching elements, and the high level can be regarded as active level of the switching elements.

Generally speaking, the driving IC (including various drivers for the display panel) can transmit the display data to the pixels on the display panel through thousands of data lines, and the gate driving signals and the light-emission control signals can be applied to each row of pixels on the display panel sequentially, the number of which depends on the resolution of the display panel. For example, the display panel can be a 2 k×2 k panel, which includes 2160 rows and 2160 columns of pixels, thus having 2160 data lines, 2160 gate driving signals G_1-G_2160 and 2160 light-emission control signals EM_1-EM_2160.

In the display period, for each row of pixels, under the control of active level pulse of the gate driving signal, the switching elements controlling the writing of data into the row of pixels are turned on, so that the display data can be written into the row of pixel units through the data lines. GL_1-GL_N are sequentially applied to pixel units on each gate driving line of the display panel, corresponding EM_1-EM_N are sequentially applied to pixel units on each light-emission control line of the display panel, to prohibit light-emission elements (e.g., OLED) in these pixel units from emitting light (the gates of switching elements for controlling light-emission elements to emit light in pixel units are at inactive level) when the corresponding gate driving signal is of active level. After display data is written into these pixel units by data lines, the light-emission elements in these pixel units emit light (the gates of the switching elements for controlling the light-emission elements to emit light in pixel units are at active level, which will be simply described as "making the pixel emit light" for convenience of description). It should be noted that the period of writing data into a row of pixel units through data lines should correspond to the period when the gate driving signal corresponding to the row of pixel units is of active level, and the light-emission control signal corresponding to the row of pixel units should be at inactive level to cut off the conduction path of the OLED, so as to avoid the influence of the writing of data on the display of the display panel. As shown in FIG. 3, taking the first row of pixels as an example, before GL_1 becomes active level, EM_1 has become inactive level (for example, the starting point of inactive level of EM_1 is leading the starting point of active level of GL_1 for a preset period of time, which is shown as two clock cycles, but it can also be other clock cycles), and during the period when GL_1 is active level, EM_1 maintains at inactive level and the data is written into the first row of pixels, and EM_1 maintains at inactive level until a period of time after the GL_1 becomes inactive level again ends (the period of time is illustrated as one clock cycle in the figure, but can be other number of clock cycles).

As mentioned earlier, in OLED touch-and-display devices, display and touch detection are mostly driven simultaneously, in this case, there are the following defects.

(1) With regard to power consumption: in the case of simultaneous driving, display driving related noises can be detected during touch detection, and in order to suppress these noises, it is necessary to increase the time of touch detection, so as to suppress noises by receiving data acquired for a longer time, however, this method requires a longer detection time, and therefore consumes more power.

(2) With regard to touch detection frequency (i.e., the frequency of touch driving signals): in the case of simultaneous driving, the touch detection frequency will involve the frequency of display driving related signals, that is, the frequency of touch driving signals needs to be selected to avoid the frequency that may seriously interfere with the display driving. Generally speaking, besides the frequency of display driving, various unavoidable external noises (such as power noise, etc.) need to be considered in the selection of the frequency of touch driving signals, therefore, the problem of interference to the frequency of display driving leads to more limited selection of the frequency of touch driving signals.

(3) With regard to the writing of display data: due to parasitic capacitance between data lines and the touch sensitive cells, in the process of charging the capacitors in the pixel cells with the voltages associated with the display data, it is easily interfered by the touch driving signals applied to the touch sensitive cells, so the capacitors may not be charged to a preset level, which may affect the display effect.

In addition, no matter whether synchronous or asynchronous driving methods are adopted, gate driving is also performed on the display panel to scan each row of pixels during the touch detection operation, and different data voltages (voltages associated with display data) are also transmitted on the data lines according to different display screen contents, and these display screen contents are usually unpredictable by the touch processor, and due to factors such as parasitic capacitance between the data lines and the touch sensitive cells, changes of these data voltages may cause unexpected interference, i.e., noise, during the touch detection operation. In this way, the touch processor can only use longer time for touch detection, so as to obtain more real touch sensing signals (also referred to as touch detection signals) through a longer time of detection, so as to improve the signal-to-noise ratio (SNR) and avoid false touch detection results due to poor SNR.

Therefore, in the embodiment of this disclosure, it is proposed to adopt time-division manner for driving touch detection and display in OLED touch-and-display devices. In this way, there is no noise interference from the display driving operation when the touch detection operation is performed, so that the touch detection does not take a longer time, and therefore power can be saved. In addition, under the condition that touch detection and display are driven in a time-division manner, there is no need to consider the timing and frequency of various signals related to display driving operation when selecting the frequency of the driving signal for touch detection operation, so there can be more selectable frequencies to combat other noise sources.

In addition, in the design process, it is necessary to make the display luminance of the display panel of the touch-and-display device uniform. Because the average display luminance of each row of pixels is related to its light-emission time length, when it is refined to each row of pixels, it is expected that the light-emission time lengths of all rows of pixels are equal, so that the display luminance of display panel is uniform and the display quality is relatively good.

Figure 4:
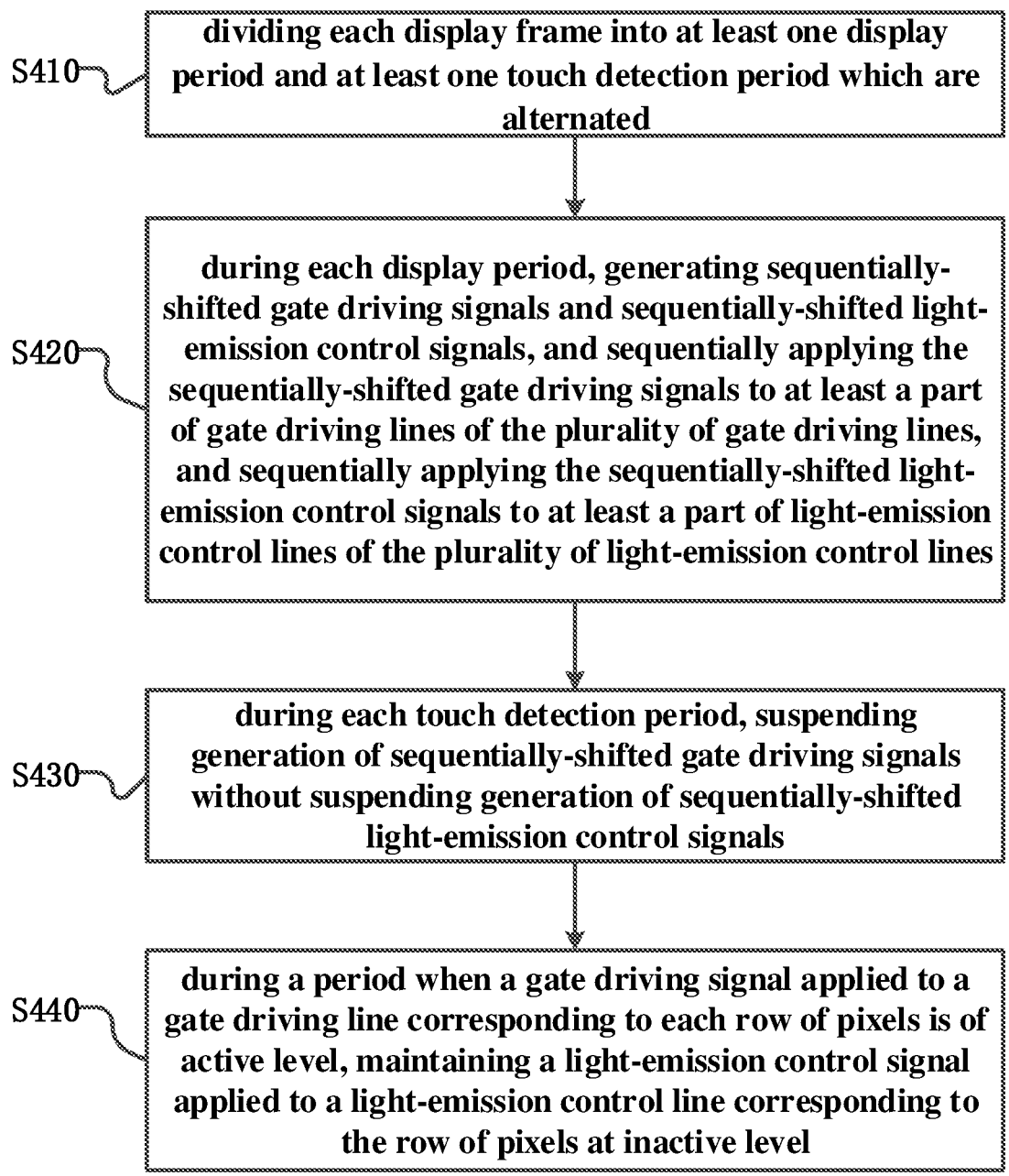
FIG. 4 shows a schematic flowchart of a method for driving the OLED touch-and-display device according to an embodiment of the present disclosure.

Therefore, the present disclosure proposes a method for driving an OLED touch-and-display device, which can realize time-division driving of display and touch detection, ensure equal light-emission time lengths of all rows of pixels are equal, and ensure the timing of the light-emission control signal and gate driving signal for the same row of pixels. The OLED touch display device comprises a display panel, and the display panel comprises a plurality of rows of pixels, a plurality of gate driving lines (GL) and a plurality of light-emission control lines (EM) in one-to-one correspondence. FIG. 4 shows a schematic flowchart of a method for driving the OLED touch-and-display device.

At step S410, each display frame is divided into at least one display period and at least one touch detection period which are alternated.

For example, each display frame is sequentially divided into a first display period, a first touch detection period, a second display period, a second touch detection period, the X-th display period and the X-th touch detection period, wherein X is an integer greater than or equal to 2. The first display period of each display frame may start after the invalid period in the head part of the display frame, and the X-th touch detection period may end before the invalid period in the tail part of the display frame.

In each display period, data-writing to at least a part row of pixels may be performed. For example, the data-writing to a first number of rows of pixels is performed in the first display period, and the data-writing to a second number of rows of pixels is performed in the second display period, where the second number of rows of pixels are immediately after the first number of rows of pixels.

In each touch detection period, touch detection of at least a part of the touch sensitive cells may be performed. For example, a plurality of touch sensitive cells on the touch sensitive layer 110 shown in FIG. 1 can be divided into a plurality of groups (e.g., 20 groups), which respectively correspond to a plurality of touch detection operations (e.g., RX-1, RX-2, . . . , RX-20), and in each touch detection period, touch detection can be performed on a plurality of touch sensitive cells included in one or more groups.

The time length of the touch detection period can be appropriately selected in consideration of the total time length of the display frame, the time length of the valid period of the display frame, the number of touch sensitive cells on the touch sensitive layer, and the touch controller. If the touch detection period is too long, the charging time for each row of pixels will be shortened if the time length of the display frame is fixed, which may lead to insufficient charging, while if the touch detection period is too short, the touch detection accuracy may not be guaranteed.

At step S420, during each display period, sequentially-shifted gate driving signals and sequentially-shifted light-emission control signals are generated, and the sequentially-shifted gate driving signals are sequentially applied to at least a part of gate driving lines of the plurality of gate driving lines, and the sequentially-shifted light-emission control signals are sequentially applied to at least a part of light-emission control lines of the plurality of light-emission control lines.

Optionally, each gate driving signal is a pulse signal including one active level pulse in one gate driving signal cycle (e.g., one display frame), and each light-emission control signal is a pulse signal including at least one inactive level pulse in one light-emission control signal cycle (e.g., one display frame). For convenience of description, in the disclosure, the light-emission control signal and gate driving signal applied to the light-emission control line and the gate driving line corresponding to the same row of pixels can be described as "the light-emission control signal and the gate driving signal for the row of pixels", and the two signals can be regarded as corresponding.

For example, in a case where the number of inactive level pulses of each light-emission control signal is one within one light-emission control signal cycle, each row of pixels are controlled to stop emitting light only in the period of the inactive level pulse, so the overall display luminance on the display panel is high, but the effect of improving the display flicker problem is poor (the switching frequency between light-emission state and stop light-emission state is low, which may be perceived by human eyes). When each light-emission control signal includes a plurality of inactive level pulses set at preset intervals, it has a better effect on improving the display flicker problem (the switching frequency between light-emission state and stop light-emission state is relatively high, which is not easy to be perceived by human eyes), but the light-emission control signal including a plurality of inactive level pulses will cause the time for each row of pixels to stop emitting light to be prolonged, so the overall display luminance on the display panel will decrease. In this case, the first inactive level pulse of each light-emission control signal in one light-emission control signal cycle can be set wide enough, for example, can be set according to the method as will be described later with reference to FIG. 8A-8B, to ensure the timing relationship between signals, and then the pulse widths of the second inactive level pulse and subsequent inactive level pulses of the light-emission control signal can be set smaller for improving the display flicker problem. In specific applications, it can be selected according to actual conditions to set the light-emission control signal to include one inactive level pulse or a plurality of inactive level pulses in one light-emission control signal cycle.

In addition, the sequentially-shifted gate driving signals and the sequentially-shifted light-emission control signals are generated by the following manners: generating sequentially-shifted gate driving signals based on a first clock signal (GCK), a shift time length (step) (time needed for shifting once) of the gate driving signal being equal to the first clock cycle of the first clock signal, and generating sequentially-shifted light-emission control signals based on a second clock signal (EMCK), a shift time length (step) of the light-emission control signal being equal to the second clock cycle of the second clock signal.

At step S430, during each touch detection period, the generation of sequentially-shifted gate driving signals is suspended without suspending the generation of sequentially-shifted light-emission control signals.

First of all, considering the display luminance of the display panel, since the light-emission luminance of pixels is related to the time length of active level of the light-emission control signal, when the light-emission control signal shifts normally during the touch detection period, the time lengths of active level of light-emission control signals applied to light-emission control lines corresponding to each row of pixels can be basically equal (because the total pulse widths of inactive level pulses of all light-emission control signals are equal), thus ensuring that the display luminance of the display panel of the touch-and-display device is basically uniform.

In addition, when the generation of the sequentially-shifted gate driving signals is suspended without suspending the generation of the sequentially-shifted light-emission control signals, the following two situations can be considered with respect to the setting manner of the first clock cycle and the second clock cycle in step S420, wherein in the following situations, comparison is made with the time length of the valid period of the display frame, and the first clock cycle and the second clock cycle (both are equal) when the display and touch detection are not driven in a time-division manner.

Situation 1: Under the condition that the time length of the valid period of the display frame can be changed, the first clock cycle for gate driving and the second clock cycle for light-emission control when the display and touch detection are driven in a time-division manner can be set to be equal. Because the touch detection period (s) is set and the shift of the gate driving signal is suspended during the touch detection period (s), the time length of the valid period of the display frame is extended by the total time length of the touch detection period (s).

Situation 2: Under the condition that the time length of the valid period of the display frame is not changed, because the touch detection period (s) is set, and the shift of the gate driving signal is suspended during the touch detection period (s), which means that the data-writing (gate driving) of all rows of pixels needs to be completed within a shortened total display time length, it is necessary to shift the gate driving signal within the shortened total display time length (based on the first clock cycle) faster than the situation where the display and touch detection are not driven in a time-division manner. At the same time, since the shift of the light-emission control signal is not suspended during the touch detection period, even if the touch detection period is set, it will not affect the shift of the light-emission control signal. Therefore, compared with the situation where the display and touch detection are not driven in a time-division manner, the light-emission control of all rows of pixels is completed in the same time length of the valid period of the display frame, so there is no need to change the speed of the shift of the light-emission control signal (based on the second clock cycle). Therefore, the first clock cycle should be smaller than the second clock cycle, so that the data-writing and light-emission control of all rows of pixels can be completed within a fixed time length of the valid period of the display frame.

In addition, in the touch detection period, because the shift of the gate driving signal is suspended, it is not necessary to write the display data from the data lines. In this case, because the gate driving signal applied on any gate driving line on the display panel is invalid, data-writing will not be performed, so the voltages on the data lines can stay at any voltage without affecting the display operation.

At step S440, during a period when a gate driving signal applied to a gate driving line corresponding to each row of pixels is of active level, a light-emission control signal applied to a light-emission control line corresponding to the row of pixels is maintained at inactive level.

Specifically, in the above two situations described in step S430, it is necessary to reasonably set the gate driving signal and light-emission control signal for each row of pixels according to the circuit structure and working process of the pixel unit, so that they meet the preset timing relationship. For example, the preset timing relationship can be as follows: during a period when a gate driving signal applied to a gate driving line corresponding to each row of pixels is of active level, a light-emission control signal applied to a light-emission control line corresponding to the row of pixels is maintained at inactive level. In addition, if the working process of the circuit structure of the pixel unit also includes a reset stage, as shown in FIG. 2A-2B, the light-emission control signal for each row of pixels should also be maintained at inactive level during the reset stage. That is to say, during each display period, the gate driving lines and the corresponding light-emission control lines to which some rows of pixels are connected are sequentially applied with the gate driving signals and light-emission control signals, in which data needs to be written in these pixels during the display period, so that data can be written into these pixels normally (for example, during the period when the gate driving signals for respective rows of pixels are active level) and these pixels can emit light, under the control of their respective gate driving signals and light-emission control signals.

In situation 1, that is, the time length of the valid period of the display frame can be changed, the first clock cycle for generating sequentially-shifted gate driving signals (for data writing) and the second clock cycle for generating sequentially-shifted light-emission control signals are set to be equal, the step S440 may specifically include: setting inactive level pulses included in the light-emission control signal in the following manner, such that the gate driving signal and the light-emission control signal for each row of pixels satisfy the preset timing relationship: the number of inactive level pulses of the light-emission control signal within each light-emission control signal cycle (e.g., display frame) is set to the sum of the number of touch detection periods existing between display periods in the light-emission control signal cycle and 1, and the time length between starting points of every two adjacent inactive level pulses within the light-emission control signal cycle is set to be equal to the time length of each touch detection period.

Figure 5:
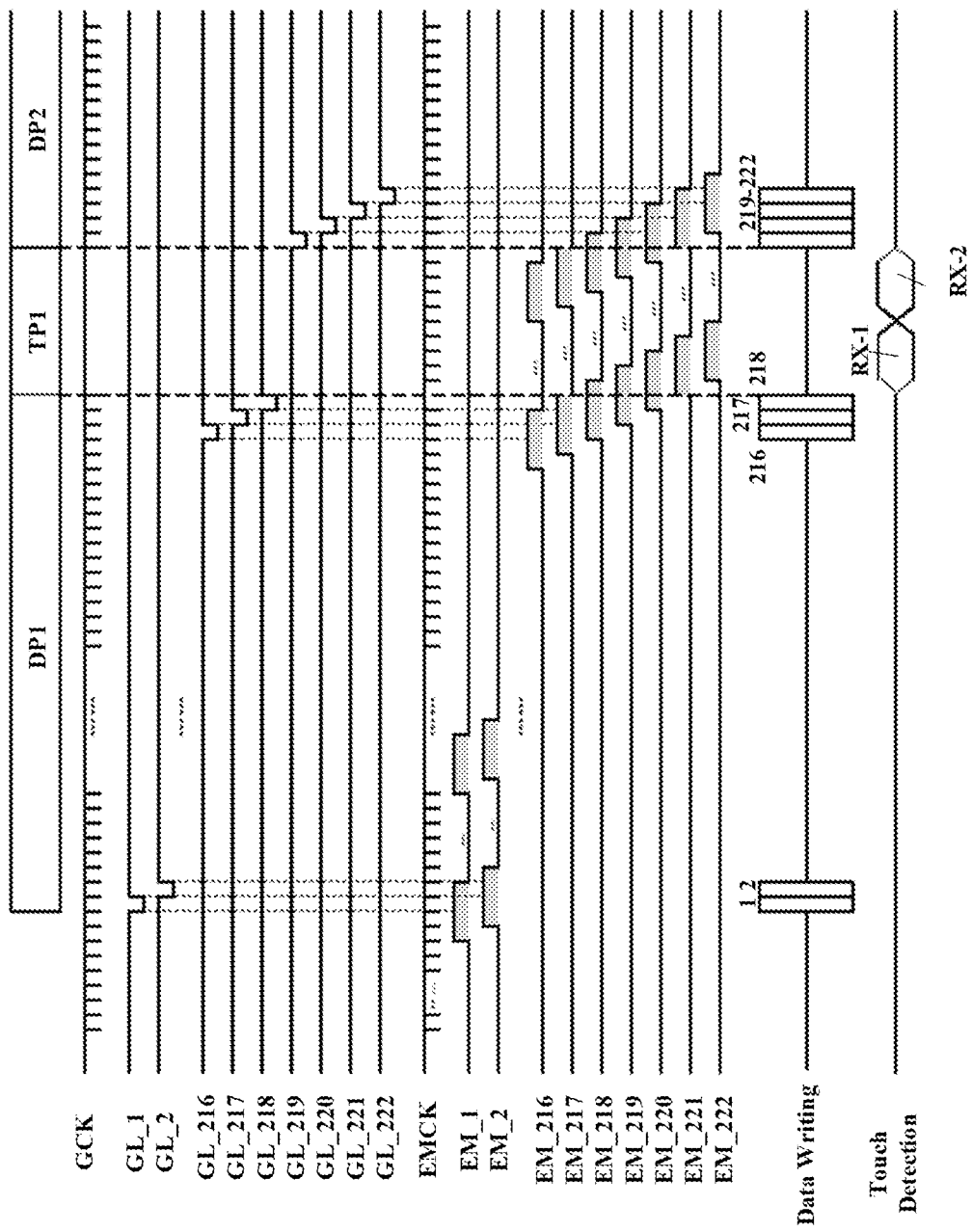
FIG. 5 shows a schematic timing diagram of respective signals when only the generation of sequentially-shifted gate driving signals is suspended without suspending the generation of sequentially-shifted light-emission control signals during the touch detection period, in the case where display and touch detection are driven in a time-division manner, after setting specific form of light-emission control signals.

FIG. 5 shows a schematic timing diagram of respective signals when only the generation of sequentially-shifted gate driving signals is suspended without suspending the generation of sequentially-shifted light-emission control signals during the touch detection period, in the case where display and touch detection are driven in a time-division manner, after light-emission control signals are set in the above-mentioned manner.

As shown in FIG. 5, the number of touch detection periods is 1, so the light-emission control signal includes two inactive level pulses in one light-emission control signal cycle. In a case where the generation of the sequentially-shifted gate driving signals is suspended but the generation of the sequentially-shifted light-emission control signals is not suspended during the first touch detection period TP1 after the first display period DP1 (after the gate driving of the 218th row of pixels is completed and the writing of data is already performed), when the second display period DP2 starts after the first touch detection period TP1 ends, the first gate driving signal (GL_219) and the corresponding light-emission control signal (EM_219) generated in the second display period can also satisfy the preset timing relationship. This is because before the touch detection period (TP1) starts, the first inactive level pulse (the first one counted from left to right along the time axis, the left inactive level pulse of the light emission control signals EM_1 to EM_218 shown in the figure, that is, the inactive level pulse generated earlier than the other inactive level pulse in time) of each light-emission control signal of the light-emission control signals (EM_1-EM_218) for the first to 218th rows of pixels and its corresponding gate driving signal (GL_1-GL_218) satisfy the preset timing relationship; during the touch detection period, the shift of the light-emission control signal (EM_219 and subsequent light-emission control signals) continues, while the shift of the gate driving signal (GL_219 and subsequent gate driving signals) is suspended; and when the touch detection period ends, the second inactive level pulse (the second one counted from left to right along the time axis, the right inactive level pulse of the light emission control signal EM_219 shown in the figure, that is, the inactive level pulse generated later than the other inactive level pulse in time) of the light-emission control signal EM_219 can also maintain at inactive level during the period when its corresponding gate driving signal is of active level for writing data to the 219th row of pixels, thus preventing the pixels from emitting light.

Figure 6:
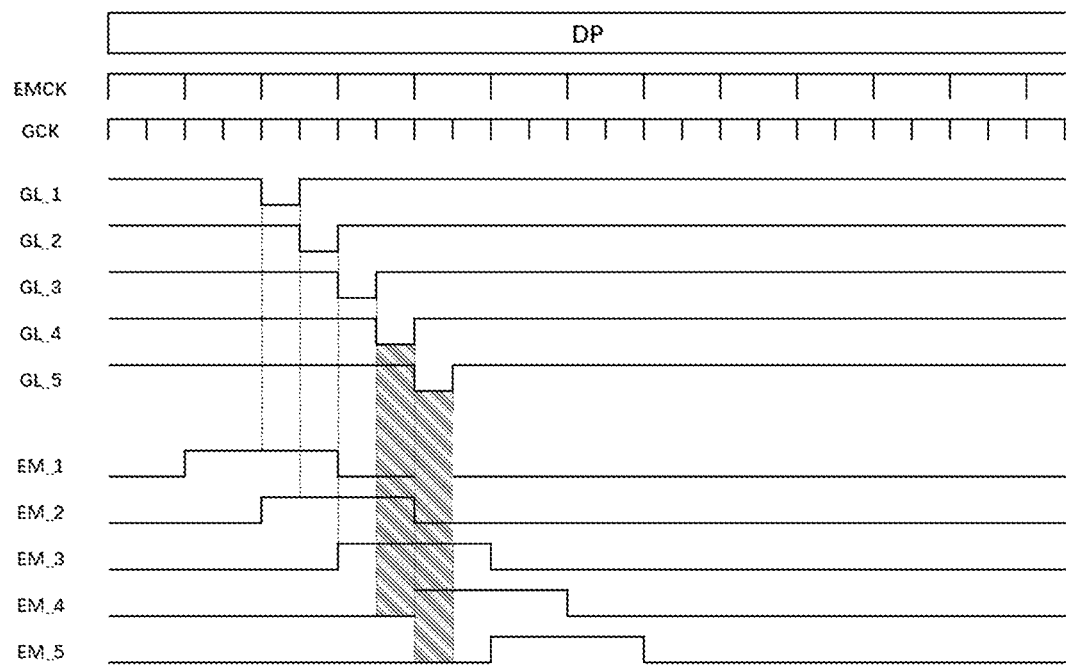
FIG. 6 is a schematic timing diagram showing that the light-emission control signal and corresponding gate driving signal no longer meet the preset timing relationship during the shift.

In situation 2, that is, the time length of the valid period of the display frame is not changed, and the first clock cycle for generating sequentially-shifted gate driving signals (for data-writing) is smaller than the second clock cycle for generating sequentially-shifted light-emission control signals. FIG. 6 is a schematic timing diagram showing that the light-emission control signal and corresponding gate driving signal no longer meet the preset timing relationship during the shift. As shown in FIG. 6, the second clock cycle (EMCK) is twice as large as the first clock cycle (GCK), and the shift of the light-emission control signal is performed with the second clock cycle as the shift time length, and the shift of the gate driving control signal is performed with the first clock cycle as the shift time length, so the shift of the gate driving signal is faster than the shift of the light-emission control signal. In this way, during the period when the gate driving signal GL_1 for the first row of pixels is of active level (shown as low level in the figure), the light-emission control signal EM_1 is of inactive level (shown as high level in the figure), which satisfies the preset timing relationship; the gate driving signal GL_2 for the second row of pixels is of active level (shown as low level in the figure), the light-emission control signal EM_2 is of inactive level (shown as high level in the figure), which satisfies the preset timing relationship; the gate driving signal GL_3 for the third row of pixels is of active level (shown as low level in the figure), the light-emission control signal EM_3 is of inactive level (shown as high level in the figure), which satisfies the preset timing relationship (if inactive level still needs to be maintained in the reset stage, the preset timing relationship is not satisfied at this time); however, during the period when the gate driving signal GL_4 for the fourth row of pixels is of active level (shown as low level in the figure), the light-emission control signal EM_4 is of active level (shown as low level in the figure), so the preset timing relationship is no longer satisfied, as shown by the shaded part in the figure, and therefore the gate driving signal and the light-emission control signal for each of the subsequent rows of pixels no longer satisfy the preset timing relationship (not shown).

That is to say, because that shift time length of the light-emission control signal is greater than that of the gate driving signal, that is, the shift speed of the light-emission control signal is slower than that of the gate driving signal, the starting point of inactive level of the light-emission control signal for the first row of pixels is leading the starting point of active level of the gate driving signal in time, but with the passage of time, leading amount will gradually decrease. Therefore, there may be a case where when the gate driving signal for a certain row of pixels is switched to an active level, the light-emission control signal for the row of pixels may not generate an invalid pulse timely, that is, the starting point of inactive level of the light-emission control signal for the row of pixels has lagged behind the starting point of active level of the gate driving signal for the row of pixels in time, so the gate driving signal and light-emission control signal for the row of pixels do not satisfy the preset timing relationship.

Therefore, in order to avoid the above problems, the operation of setting the gate driving signal and the light-emission control signal for each row of pixels involved in step S440 may specifically include the following specific sub-steps.

Figure 7A:
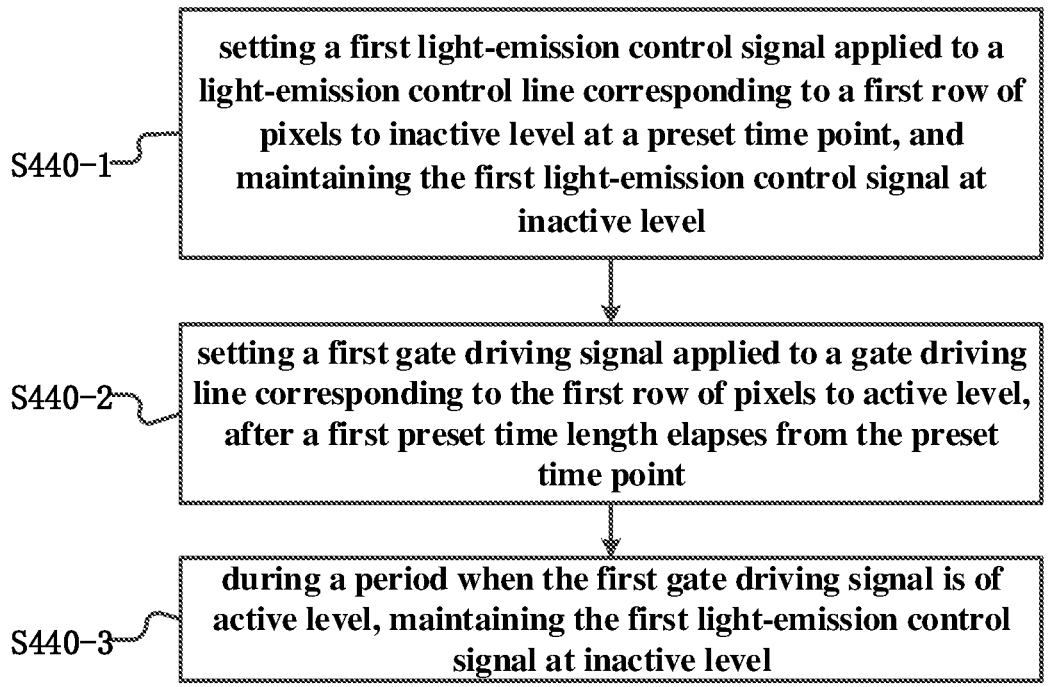
FIG. 7A shows a schematic flowchart of sub-steps of step S440 of the method described in FIG. 4.
Figure 7B:
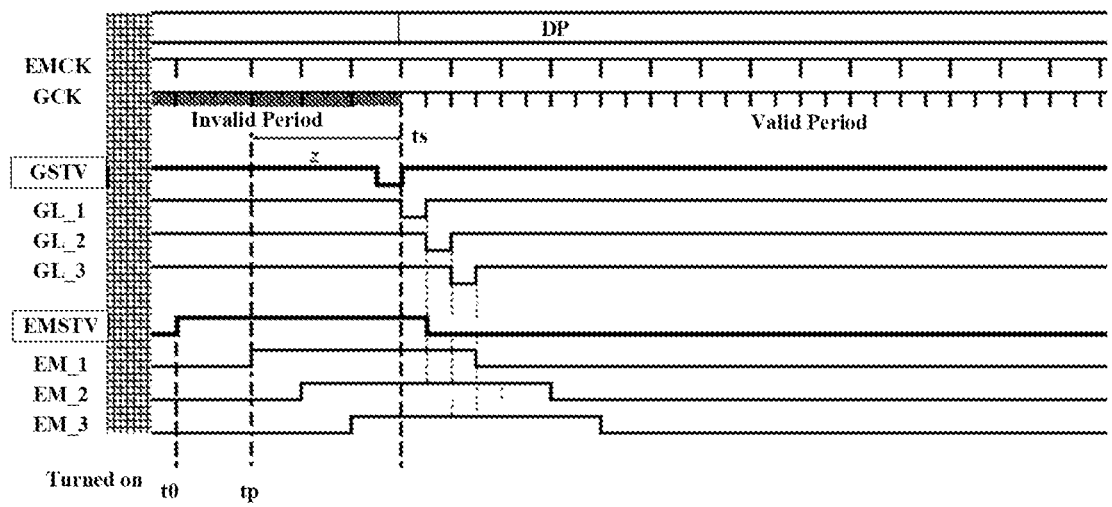
FIG. 7B-7C show schematic diagrams of the process for generating the gate driving signals and the light-emission control signal for each row of pixels.
Figure 7C:
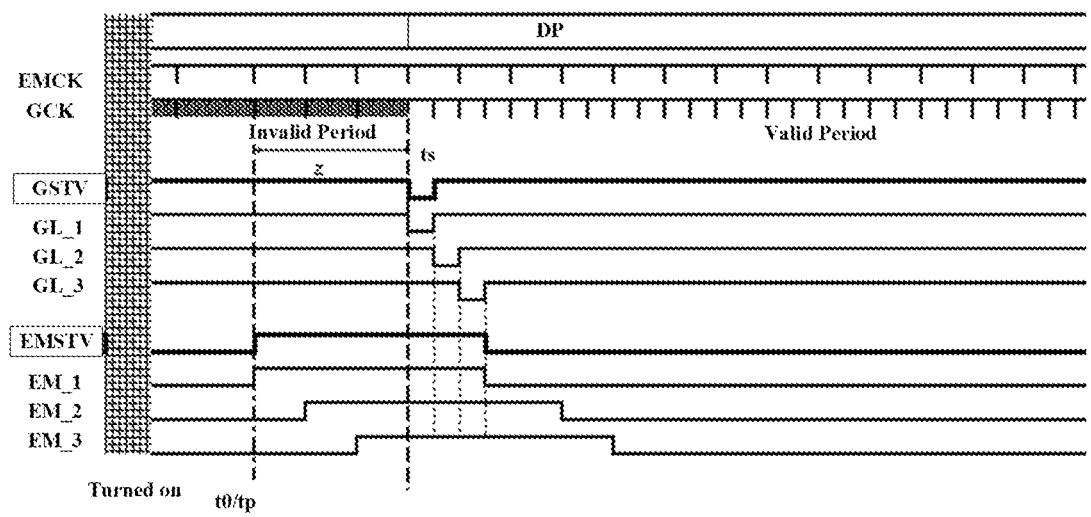

FIG. 7A shows a schematic flowchart of sub-steps of step S440 of the method described in FIG. 4. FIG. 7B-7C show schematic diagrams of the process for generating the gate driving signals and the light-emission control signal for each row of pixels.

As shown in FIG. 7A, in step S440-1, a first light-emission control signal applied to the light-emission control line corresponding to the first row of pixels is set at a preset time point and maintained at inactive level.

Optionally, after the OLED touch display device is powered on, first, light-emission control signals applied to the plurality of light-emission control lines corresponding to the plurality of rows of pixels are set and maintained at active level. For example, the power-on initialization process can initialize the light-emission control signal for each row of pixels to active level (make each pixel emit light based on the initialized display data), so as to facilitate the subsequent generation of inactive level pulses.

In addition, a first start pulse signal (EMSTV) may be set and initialized as being active level, and at a time point after the end of the power-on initialization process, the first start pulse signal is switched from active level to inactive level and maintained at inactive level for a certain time (pulse width of inactive level pulse), and may be supplied to, for example, a shift register unit whose output is connected with the light-emission control line corresponding to the first row of pixels to generate an inactive level pulse of the first light-emission control signal for the first row of pixels, i.e., the first light-emission control signal is switched from the initialized active level to inactive level and maintained at inactive level for the certain time. That is, the first light-emission control signal has the same attribute as the first start pulse signal, but only one second clock cycle later than the first start pulse signal, the first light-emission control signal may be equivalent to the signal generated by shifting the first start pulse signal. In this case, the preset time point in step S440-1 is a time point at the end of one second clock cycle after the time point when the first start pulse signal is switched to inactive level. Thereafter, the first light-emission control signal for the first row of pixels may be sequentially shifted based on the second clock cycle to generate sequentially shifted light-emission control signals for providing to subsequent light-emission control lines.

As shown in FIG. 7B, a first start pulse signal (EMSTV) is switched from active level to inactive level at a time point t0 after the power-on initialization process ends, and maintained at inactive level for a certain time (pulse width). After one second clock cycle, the first light-emission control signal (EM_1) for the first row of pixels is also switched from active level to inactive level, which is equivalent to that the first start pulse signal (EMSTV) is shifted by one second clock cycle to generate the first light-emission control signal (EM_1) for the first row of pixels. Similarly, after another second clock cycle, the second light-emission control signal (EM_2) for the second row of pixels is also switched from active level to inactive level, which is equivalent to that the first light-emission control signal is shifted by one second clock cycle to generate the second light-emission control signal (EM_2), and so on, and in this way, light-emission control signals (EM_3, EM_4, etc.) to be applied to respective light emission control lines are generated. In this case, the preset time point in step S440-1 is the time point tp at the end of one second clock cycle after t0 in FIG. 7B.

Of course, in other embodiments, according to the specific structure of the light-emission control driver that generates sequentially-shifted light-emission control signals, the first light-emission control signal may also be synchronized with the first start pulse signal.

In this case, as shown in FIG. 7C, the first light-emission control signal (EM_1) may also be synchronized with the first start pulse signal (EMSTV). At this time point t0, both the first start pulse signal (EMSTV) and the first light-emission control signal (EM_1) for the first row of pixels are switched from active level to inactive level, and then similarly, after one second clock cycle, the second light-emission control signal (EM_2) for the second row of pixels is also switched from active level to inactive level, that is, the first light-emission control signal is shifted by one second clock cycle to generate the second light-emission control signal (EM_2) for the second row of pixels, and so on, thereby generating light emission control signals (EM_3, EM_4, etc.) applied to respective light emission control lines. In this case, the preset time point in step S440-1 is t0 in FIG. 7C.

Optionally, the first start pulse signal may include a plurality of inactive level pulses in a display frame period, for example, one inactive level pulse may be output first and another inactive level pulse may be output after a predetermined period of time, and the first start pulse signal including these inactive level pulses may also be used to generate sequentially-shifted light-emission control signals based on the second clock period for providing to subsequent light-emission control lines, so each light-emission control signal may also include a plurality of inactive level pulses.

Of course, the number of inactive level pulses included in the light-emission control signal is not arbitrary, but needs to be determined by considering factors such as the total time length of the display frame, the time length of valid period of the display frame, and the pulse width of inactive level pulses.

In addition, as mentioned above, the light-emission control signal including a plurality of inactive level pulses will cause the time for each row of pixels to stop emitting light to be prolonged, so the overall display luminance on the display panel will decrease, at this time, as a better scheme, the first inactive level pulse of each light-emission control signal generated in one light-emission control signal cycle (display frame period) can be set to be wide enough, for example, greater than the minimum value of the first preset time length as will be described later, and the pulse widths of the second and subsequent inactive level pulses are set smaller, so that the display flicker problem can be improved, and the overall display luminance of the display panel will not be excessively influenced.

At step S440-2, after a first preset time length has elapsed from the preset time point, the first gate driving signal applied to the gate driving line corresponding to the first row of pixels is set to active level.

Similarly, after the OLED touch display device is powered on, besides setting and maintaining the light-emission control signals for the plurality of rows of pixels at active level, the gate driving signals applied to the plurality of gate driving lines corresponding to the plurality of rows of pixels are also set and maintained at inactive level. For example, the power-on initialization process can also initialize the gate driving signal for each row of pixels to inactive level, so as to facilitate subsequent generation of active level pulses.

In addition, a second start pulse signal (GSTV) may be set and initialized as being inactive level, and when the time length of a period during which the first start pulse signal maintains at inactive level reaches a specific time length, the second start pulse signal is switched from inactive level to active level and maintained at active level for a certain time (the pulse width of the active level pulse, which is one first clock cycle in the embodiment of the present disclosure, but is not limited to this), and can be supplied to, for example, a shift register unit whose output is connected to the gate driving line of the first row of pixels to generate an active pulse of a first gate driving signal for the first row of pixels, i.e., the first gate driving signal is switched from the initialized inactive level to active level and maintained at active level for the certain time. That is, the first gate driving signal has the same attribute as the second start pulse signal, but is one first clock cycle later than the second start pulse signal, which is equivalent to the signal generated by shifting the second start pulse signal. Thereafter, the first gate driving signal for the first row of pixels may be sequentially shifted based on the first clock cycle, to generate sequentially-shifted gate driving signals for providing to subsequent gate driving lines. When the first gate driving signal is switched to active level, data-writing to the first row of pixels can be started, and the time point when the first gate driving signal is switched to active level can be taken as the starting point of the valid period of the display frame.

For example, still referring to FIG. 7B, a second start pulse signal (GSTV) is switched from inactive level to active level at a time point ts which is specific time length $(Z+(T_{EMCK}-T_{GCK}))$ later than the time point t0 when the first start pulse signal (EMSTV) is switched to inactive level, and the second start pulse signal is maintained at active level for a certain time (pulse width). After one first clock cycle, the first gate driving signal (GL_1) for the first row of pixels is also switched from inactive level to active level, which is equivalent to that the second start pulse signal (GSTV) is shifted by one first clock cycle to generate the first gate driving signal (GL_1) for the first row of pixels, and then the second gate driving signal (GL_2) for the second row of pixels is also switched from inactive level to active level after another one first clock cycle, which is equivalent to that the first gate driving signal is shifted by one first clock cycle to generate the second gate driving signal (GL_2) for the second row of pixels, and so on, thereby generating gate driving signals (GL_3, GL_4, etc.) applied to the gate driving lines.

In the embodiment shown in FIG. 7B, the time length between the time point when the first light-emission control signal (EM_1) is switched from active level to inactive level and the time point when the first gate driving signal (GL_1) is switched from inactive level to active level is the first preset time length Z, while the specific time length between the time point t0 when the first start pulse signal (EMSTV) is switched from active level to inactive level and the time point ts when the second start pulse signal (GSTV) is switched from inactive level to active level is $Z+(T_{EMCK}-T_{GCK})$, which is greater than Z, where $T_{EMCK}$ denotes the second clock cycle, and $T_{GCK}$ denotes the first clock cycle.

Of course, in other embodiments, according to the specific structure of the gate driver that generates sequentially shifted gate driving signals, the first gate driving signal may also be synchronized with the second start pulse signal.

In this case, as shown in FIG. 7C, the first gate driving signal (GL_1) may also be synchronized with the second start pulse signal (GSTV). At this time point ts, both the second start pulse signal (GSTV) and the first gate driving signal (GL_1) for the first row of pixels are switched from inactive level to active level, and then, similarly, after one first clock cycle, the second gate driving signal (GL_2) for the second row of pixels is switched from inactive level to active level, and so on, thereby generating gate driving signals applied to respective gate driving lines.

In the embodiment shown in FIG. 7C, the time length between the time point when the first light-emission control signal (EM_1) is switched from active level to inactive level and the time point when the first gate driving signal (GL_1) is switched from inactive level to active level is the first preset time length Z, while the specific time length between the time point t0 when the first start pulse signal (EMSTV) is switched from active level to inactive level and the time point is when the second start pulse signal (GSTV) is switched from inactive level to active level is also Z.

Therefore, the starting point of inactive level (i.e., the starting point of the first inactive level pulse) of the first light-emission control signal for the first row of pixels is leading the starting point of active level (i.e., the starting point of the active level pulse) of the first gate driving signal for the first row of pixels, and the leading amount is the first preset time length. The first preset time length needs to be set long enough so that the starting point of inactive level of the light-emission control signal for the last row of pixels of the display panel is leading the starting point of active level of the gate driving signal for the last row of pixels, and the leading amount is a second preset time length, which is greater than or equal to a predetermined time length threshold $Z_0$, where the predetermined time length threshold $Z_0$ can be zero (if the working process of the circuit structure of the pixel unit also includes a reset phase (lasting for one first clock cycle), the predetermined time length threshold $Z_0$ is one first clock cycle, and if each time length is expressed in a unit of a second clock cycle on which the shift of the light-emission control signal is based, $Z_0$ is preferably a second clock cycle), that is, the starting point of inactive level of the light-emission control signal for each row of pixels is leading the starting point of active level of the gate driving signal of the row of pixels, and the leading amount is at least the second preset time length.

The specific setting method of the first preset time length will be described in detail later.

At step S440-3, during the period when the first gate driving signal is of active level, the first light-emission control signal is still maintained at inactive level.

Specifically, since the data voltages on the data lines (the voltages associated with the display data) will be used to write data to each rows of pixels during the period when the gate driving signal for the row of pixels is of active level, these pixels should not emit light, the light-emission control signal for the row of pixels still needs to be maintained at inactive level.

Optionally, at a time point when the gate driving signal for the row of pixels is switched back from active level to inactive level or after a period of time after the time point, the light-emission control signal for the row of pixels is switched back from inactive level to active level, so that the row of pixels can emit light.

As described above, when the timing of the first light-emission control signal and the first gate driving signal for the first row of pixels is determined, they will be shifted downward based on the second clock cycle and the first clock cycle, respectively, to generate sequentially-shifted light-emission control signals for providing to subsequent light-emission control lines, and sequentially-shifted gate driving signals (suspending the generation during touch detection period) for providing to subsequent gate driving lines.

The setting method of the first preset time length is described in detail below.

First, it is assumed that a display frame is divided into a plurality of display periods and touch detection periods which are alternated, which are respectively identified as a first display period, a first touch detection period, a second display period and a second touch detection period . . . and so on, and the adjacent display period and touch detection period serve as a time unit. Each time unit corresponds to a part of rows of pixels, and the data-writing of the part of pixels is completed within each time unit. The time point when the gate driving signal for the first row of pixels becomes active level is considered as the starting time point of the valid period of the display frame. That is, before the start time point of the valid period of the display frame, multiple light-emission control signals including the first light-emission control signal have been generated.

In a specific example, if the display panel has 3000 rows of pixels, the time length of valid period of a display frame is 3000 second clock cycles and is divided into three time units. Data-writing of 1-1000th rows of pixels is completed in the first time unit (including the first display period and the first touch detection period), which is actually completed in the first display period, data-writing of 1001-2000th rows of pixels is completed in the second time unit (including the second display period and the second touch detection period), which is actually completed in the second display period, and data-writing of 2001-3000th rows of pixels is completed in the third time unit (including the third display period and the third touch detection period), which is actually completed in the third display period.

Optionally, the time length of the display frame, each display period and each touch detection period can be expressed in a unit of a second clock cycle.

The respective time lengths of each display period and each touch detection period can be determined in advance. For example, each display period may last for a first number (M1) of second clock cycles $T_{EMCK}$, with a time length expressed by DP, i.e., $DP=M1 \times T_{EMCK}$, and each touch detection period may last for a second number (M2) of second clock cycles $T_{EMCK}$, with a time length expressed by TP, i.e., $TP=M2 \times T_{EMCK}$, with M1+M2 equal to the number of rows of pixels (M) corresponding to each display period (each time unit), for example, M is 1000.

As mentioned above, within the time length of valid period of the whole display frame, the first light-emission control signal for the first row of pixels is used to sequentially shifted based on the second clock cycle $T_{EMCK}$ (since a plurality of light-emission control signals including the first light-emission control signals have been generated before the start of valid period of the display frame, herein, the sequential shift of the light-emission control signal can be understood as all light-emission control signals for all rows of pixels sequentially changing from inactive level to active level), to sequentially control all rows of pixels to emit light. Therefore, the second clock cycle $T_{EMCK}$ is the ratio of the time length of valid period of the display frame to the number of rows of pixels $T_{EMCK}=A/(N*M)$, where N is the number of time units included in a display frame and M is the number of rows of pixels corresponding to each time unit; and within the total time length of all display periods except the touch detection period in the display frame, the gate driving signals of all rows of pixels are sequentially generated based on the first clock cycle $T_{GCK}$, so the first clock cycle $T_{GCK}$ is the ratio of the total time length of all display periods (A*DP/(DP+TP)) to the number of rows of pixels $T_{GCK}=A*(DP/(DP+TP))/(N*M)$. Therefore, the first clock cycle $T_{GCK}$ and the second clock cycle $T_{EMCK}$ satisfy the following relationship: $T_{GCK}=T_{EMCK}\times DP/(DP+TP)=T_{EMCK}\times M1/(M1+M2)=T_{EMCK}\times M1/M$.

Since each display period lasts for M1 second clock cycles, it can be determined that at the end of each display period (i.e., at the end of the M1-th second clock cycle or at the start of the (M1+1)-th second clock cycle), the light-emission control signal has been shifted M1 times, while the gate driving signal has been shifted by $DP/T_{GCK}=DP/(T_{EMCK}\times DP/(DP+TP))=M1+M2=M$, that is, all rows of pixels corresponding to this display period (this time unit) have been subjected to gate driving. At the end of the touch detection period after this display period (i.e., at the end of the (M1+M2=M)-th second clock cycle or at the start the (M1+M2+1=M+1)-th second clock cycle), the gate driving signal of the (M1+M2+1=M+1)-th row of pixels is switched to active level, and at this time point, since the first light-emission control signal has just been shifted M1+M2=M times, at the start of the display period of the next time unit, the time distance between the starting point of inactive level of the (M1+M2+1)-th light-emission control signal and the starting point of the inactive level of the first light-emission control signal is $T_{EMCK}\times(M1+M2)$, and the time distance between the starting point of active level of the (M1+M2+1)-th gate driving signal and the starting point of active level of the first gate driving signal is $T_{GCK}\times(M1+M2)+TP=T_{EMCK}\times M1+TP=T_{EMCK}\times(M1+M2)$. That is, compared with the timing between the first light-emission control signal and the first gate driving signal, the timing between the (M1+M2+1)-th light-emission control signal and the (M1+M2+1)-th gate control signal is the same, so in the next time unit, the above shift process is repeated for the light-emission control signals and gate driving signals for the next M1+M2=M rows of the pixels corresponding to the next time unit.

That is, for all time units, the timing relationship between the first light-emission control signal and the first gate driving signal in each time unit is the same. Therefore, as long as the light-emission control signal and gate driving signal for each row of pixels satisfy the preset timing relationship in the first time unit, the light-emission control signal and gate driving signal for each row of pixels can also satisfy the preset timing relationship in the whole display frame. Therefore, the value of the first preset period can be determined only for one time unit, so that the light-emission control signal and the gate driving signal for each row of pixels satisfy a preset timing relationship.

As mentioned above, the starting point of inactive level of the first light-emission control signal for the first row of pixels is leading the starting point of active level of the first gate driving signal in time, but with the passage of time, the leading amount will gradually decrease, and even the starting points of inactive level of the light-emission control signals for some rows of pixels will lag behind the starting points of active level of the gate driving signals in time, therefore, the time length of the first preset period can be determined according to the following criteria: at the end point of the display period of one time unit, the starting point of inactive level of the light-emission control signal for the last row of pixels in the rows of pixels corresponding to the time unit is still leading the starting point of active level of the gate driving signal for the last row of pixels, and the leading amount is a second preset time, which is greater than or equal to a predetermined time length threshold $Z_0$, $Z_0$ indicates the minimum time length value that the starting point of the first inactive level pulse of the light-emission control signal for each row of pixels is leading the starting point of the active level pulse of the gate driving signal for the row of pixels. $Z_0$ is a value greater than or equal to 0. Optionally, if the working process of the circuit structure of the pixel unit includes a reset phase, $Z_0$ can be a value greater than one first clock cycle, and since the time length can be expressed in a unit of the second clock cycle, $Z_0$ can be a positive integer multiple of the second clock cycle.

Optionally, the first preset time length Z can be $Z>TP+Z_0$.

Specifically, as described above, the value of Z can be calculated for only one time unit. The time length of a display period in this time unit is $DP=M1\times T_{EMCK}$, and the length of a touch detection period is $TP=M2\times T_{EMCK}$, and M1+M2=M is the number of rows of pixels corresponding to this time unit. Since all rows of pixels corresponding to the time unit have been subjected to gate driving during the display period, when the display period ends, it is necessary to maintain the corresponding light-emission control signal at inactive level during the period when the gate driving signal for the last row of pixels of all rows of pixels corresponding to the display period is of active level.

According to the relationship between the first clock cycle and the second clock cycle, the shift time length of the light-emission control signal is $T_{EMCK}$, and the shift time length of the gate driving signal is $T_{EMCK}\times DP/(DP+TP)$. If in the display period, during the period when the gate driving signal for the last row of pixels of all rows of pixels corresponding to the display period is of active level, the light-emission control signal for the last row of pixels needs to be maintained at inactive level, it is necessary to make the leading amount of the starting point of inactive level of the light-emission control signal for each row of pixels relative to the starting point of active level of the corresponding gate driving signal to be able to ensure that, even though the leading amount is continuously reduced with the passage of time, the leading amount of the starting point of inactive level of the light-emission control signal for the last row of pixels relative to the starting point of active level of the corresponding gate driving signal is still greater than the predetermined time length threshold $Z_0$.

Figure 8A:
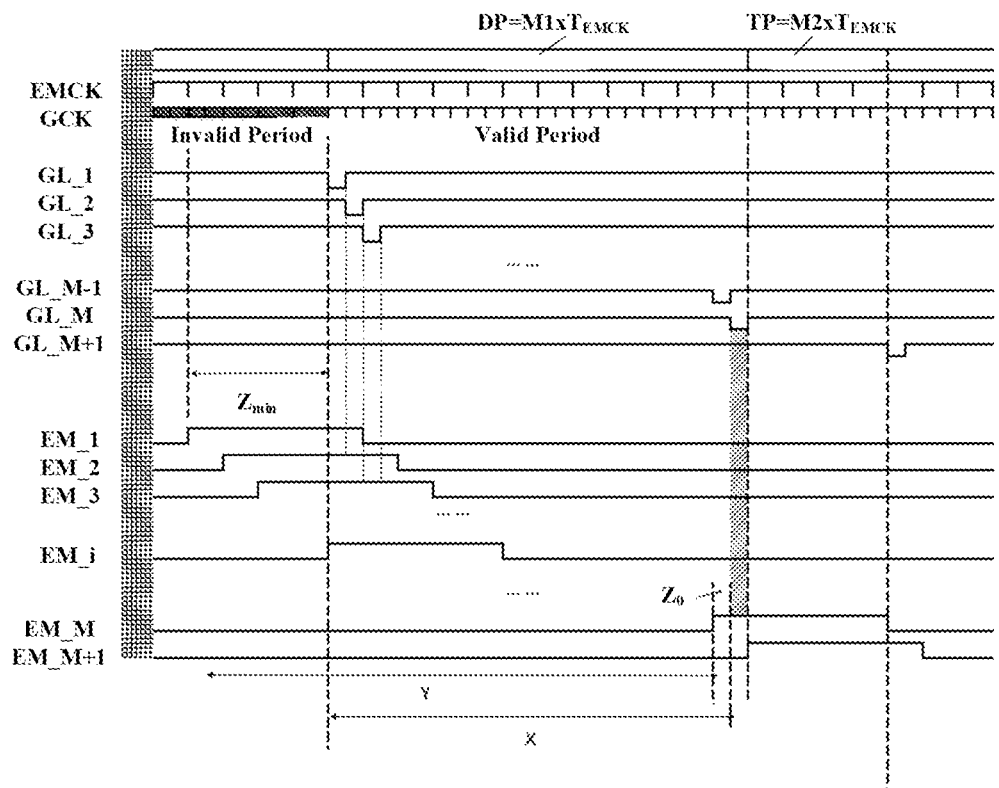
FIG. 8A-8B show schematic diagrams of the process for setting the first preset time length according to an embodiment of the present disclosure.
Figure 8B:
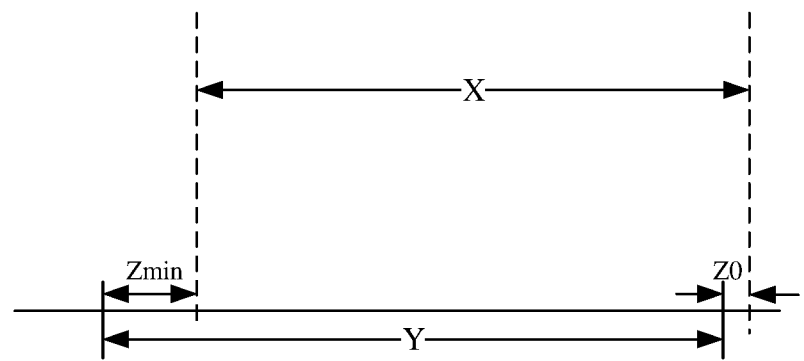

FIG. 8A-8B show schematic diagrams of setting the first preset time length according to an embodiment of the present disclosure.

As shown in FIG. 8A-8B, the minimum value $Z_{min}$ of Z is such that the light-emission control signal (EM_M) for the last row of pixels in one time unit does not become inactive level until the time point $Z_0$ before the gate driving signal (GL M) of the last row (M-th row) of pixels becomes active level, and both M1 and M2 in the figure indicate number of the second clock cycles included in the display period and touch detection period in one time unit.

A time distance Y from the starting point of invalid level pulse of the first light-emission control signal (EM_1) to the starting point of the invalid level pulse of the M1+M2=M-th light-emission control signal (EM_M) can be expressed as:

$$Y=(M1+M2-1)\times T_{EMCK}$$

A time distance X from the starting point of active level pulse of the first gate driving signal to the starting point of active level pulse of the (M1+M2)-th gate driving signal can be expressed as:

$$X=(M1+M2-1)\times T_{GCK}$$

Furthermore, the following relationship can be satisfied:

$$Y+Z_0-Z_{min}=X$$

Therefore, it can be expressed as the following formula:

$$(M1+M2-1)\times T_{EMCK}-Z_{min}+Z_0=(M1+M2-1)\times T_{GCK}=(M1+M2-1)\times T_{EMCK}\times M1/(M1+M2)$$

That is, $Z_{min}=Z_0+M2\times(M-1)/M\times T_{EMCK}$

Generally, the value of M is much larger than 1, so (M−1)/M can be approximated as 1.

Therefore, $Z_{min}=Z_0+M2\times T_{EMCK}=Z_0+TP$

As can be seen from FIG. 8A-8B, as long as the time length of the first preset period is greater than $Z_{min}$, the time point at which the light-emission control signal for each row of pixels becomes inactive level is before the gate driving signal for that row of pixels, so that the required preset timing relationship can be satisfied.

Figure 9:
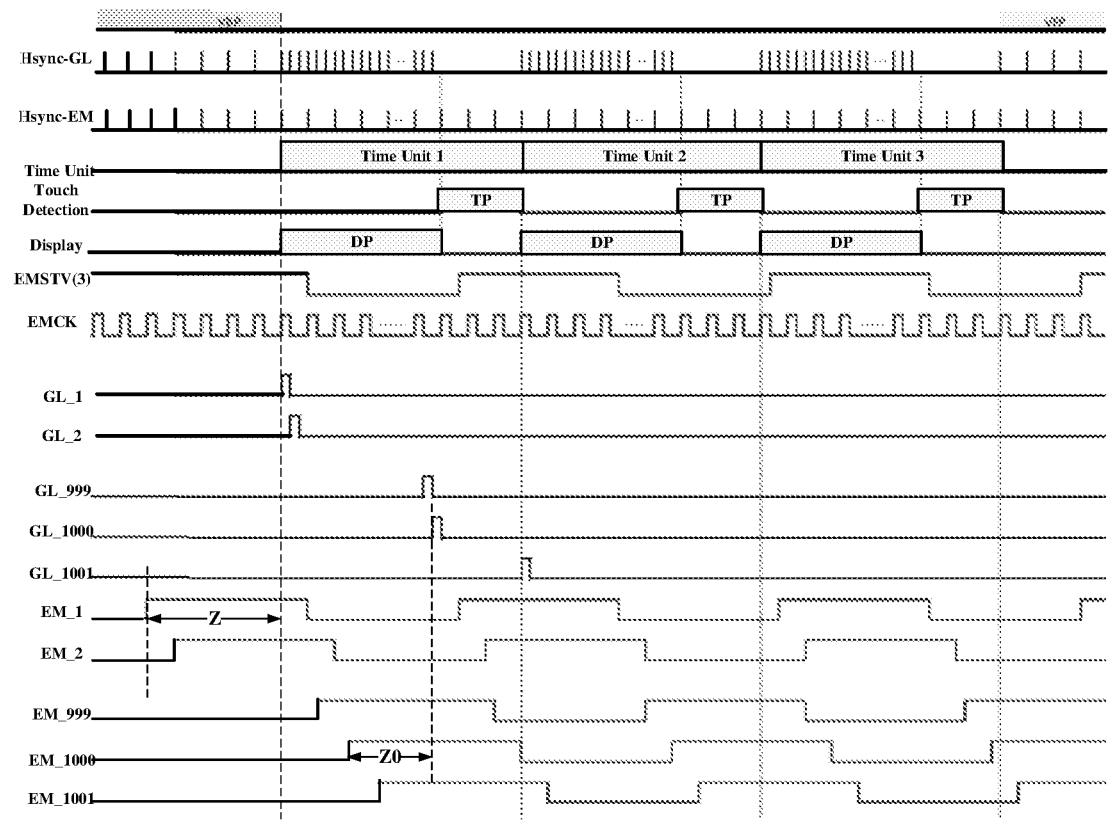
FIG. 9 shows a timing diagram within one display frame according to an embodiment of the present disclosure.

FIG. 9 shows a timing diagram within a display frame according to an embodiment of the present disclosure.

In FIG. 9, a display frame is divided into three time units, one time unit corresponds to 1000 rows of pixels, and the ratio of the time length of the display period to that of the touch detection period is 2:1. The corresponding relationship between the gate driving signal and the light-emission control signal in one time unit is shown in detail.

As shown in FIG. 9, the shift speed of gate driving signals GL_1, GL_2, . . . , GL_1000 is greater than that of the light-emission control signals EM_1, EM_2, . . . EM_1000, and at the end of the display period, GL_1000 has been switched from active level to inactive level again, and during the period when the GL_1000 is of active level, EM_1000 has been switched to inactive level before, so it is possible to write data to the 1000-th row of pixels normally. It should be noted that, with reference to FIGS. 8A-8B and 9, EM_1000 has become inactive level before the end of the display period DP. In fact, due to the existence of the first preset time length with a value of Z, the shift of EM signals EM_1-EM_200 for the 1st to 200-th row of pixels is completed before the start point of the display period DP, while the shift of EM signals for only 800 rows of pixels exists in the display period DP. Thereafter, GL_1000 is suspended from shifting downward, while EM_1000 continues shifting downward with the second clock cycle. At the end of time unit, GL_1001 is shifted 1000 times relative to GL_1, and EM_1001 is also shifted 1000 times relative to EM_1, therefore, the timing relationship between GL_1001 and EM_1001 is the same as that of GL_1 and EM_1.

That is, for each display period, the leading amount by which the starting point of inactive level of the light-emission control signal for the first row of pixels is leading the starting point of active level of the gate driving signal is an initial value Z. With passage of time, the leading amount of the starting point of inactive level of the light-emission control signal for each pixel row relative to the starting point of active level of its corresponding gate driving signal becomes less and less, and reaches the minimum value for the last row of pixels of all rows of pixels corresponding to the display period DP. After the TP period, the leading amount by which the starting point of inactive level of the light-emission control signal for the first row of pixels in the next display period is leading the starting point of active level of the gate driving signal is resumed to the initial value Z again.

In addition, in FIG. 9, the leading amount by which the starting point of first inactive level pulse of EM_1 is leading the starting point of active level pulse of GL_1, so the leading amount by which the starting point of first inactive level pulse of EM_1000 is leading the starting point of the active level pulse of GL_1000 can be $Z_0$. Of course, $Z_0$ can be zero or a first clock cycle, preferably zero or an integer multiple of the second clock cycle.

FIG. 9 shows a case where the light-emission control signal includes three inactive level pulses and the pulse widths of the three inactive level pulses are illustrated as being equal, but it should be understood by those skilled in the art that as described above, the pulse widths of the second and sequential inactive level pulses can be set smaller, and each light-emission control signal may include only one inactive level pulse. In addition, in FIG. 9, in order to more clearly show the difference between the shift speeds of the gate pulse signal and the light-emission control signal, it is shown that one second clock cycle is equal to three first clock cycles, in fact, in the case where the ratio of the display period to the touch detection period is 2:1, according to the previous calculation process, the first clock cycle should be ⅔ of the second clock cycle.

Therefore, by reasonably setting the value of the first preset time length, the preset timing relationship between the gate driving signal and the light-emission control signal for each row of pixels can be ensured for the situation 2, and the timing will not be in disorder.

According to the method for driving the OLED touch display device provided by the embodiment of the disclosure, touch detection and display can be driven in a time-division manner, so that noise interference from the display driving operation does not exist during the touch detection operation, so that the touch detection does not need a long time, and therefore power can be saved. In addition, in the case where touch detection operation and display operation are driven in a time-division manner, there is no need to consider the timing and frequency of various signals related to display driving operation when selecting the frequency of the driving signal for touch detection operation, so there can be more selectable frequencies to combat other noise sources. In addition, the pulse widths of inactive level pulses of light-emission control signals for respective rows of pixels on the display panel are the same, so the light-emission time lengths of respective rows of pixels can be approximately the same, thereby making the display luminance of the display panel uniform, so as to improve the display effect.

At the same time, when the generation of sequentially-shifted gate driving signals is suspended without suspending the generation of sequentially-shifted light-emission control signals during the touch detection period, the timing of the light-emission control signal and the gate driving signal for the same row of pixels can be ensured, for example, in a case where the time length of a display frame is not changed, the preset timing relationship between the gate driving signal and light-emission control signal for the each row of pixels can be ensured by appropriately setting the leading amount of the starting point of inactive level of the light-emission control signal relative to the starting point of active level of the gate driving signal for the first row of pixels, therefore, the timing of the light-emission control signal and the gate driving signal for each row of pixels will not be in disorder.

According to another aspect of the disclosure, a driving circuit is also disclosed, which can be used in a display panel in an OLED touch-and-display device. The driving circuit may include various drivers, such as the gate driver, the source driver and the light-emission control driver described above with reference to FIG. 1, and the driving circuit may also have a certain calculation processing function.

The driving circuit is designed to realize the method as described with reference to FIGS. 4-9, so that the display and touch detection can be driven in a time-division manner, and the light-emission control signal and gate driving signal for each row of pixels can meet the preset timing relationship, and the light-emission time lengths of all rows of pixels are basically equal, thereby making the display luminance of the display panel uniform, so as to improve the display quality.

According to another aspect of the disclosure, an OLED touch-and-display device is also disclosed. The OLED touch-and-display device may have substantially the same arrangement as that described with reference to FIG. 1. For example, an OLED touch-and-display device according to an embodiment of the present disclosure may include: a display panel including a plurality of rows of pixels and a plurality of gate driving lines (GL) in one-to-one correspondence, or including a plurality of rows of pixels, a plurality of gate driving lines (GL), and a plurality of light-emission control lines (EM) in one-to-one correspondence; a touch sensitive layer including a plurality of touch sensitive cells thereon; and a driving circuit, wherein the driving circuit can include various drivers, such as the gate driver, the source driver and the light-emission control driver described with reference to FIG. 1, and the driving circuit should also have a certain calculation processing function. That is, the driving circuit is designed to realize the method as described with reference to FIGS. 4-9, so that the display and touch detection can be driven in a time-division manner, and the light-emission control signal and gate driving signal for each row of pixels can meet the preset timing relationship, and the light-emission time lengths of all rows of pixels are basically equal, thereby making the display luminance of the display panel uniform, so as to improve the display quality.

That is to say, in the driving circuit and OLED touch display device disclosed in the embodiment of the present disclosure, touch detection and display can be driven in a time-division manner, so that noise interference from the display driving operation does not exist during the touch detection operation, so that the touch detection does not need a long time, and therefore power can be saved. In addition, in the case where touch detection operation and display operation are driven in a time-division manner, there is no need to consider the timing and frequency of various signals related to display driving operation when selecting the frequency of the driving signal for touch detection operation, so there can be more selectable frequencies to combat other noise sources. In addition, the pulse widths of inactive level pulses of light-emission control signals for respective rows of pixels on the display panel are the same, so the light-emission time lengths of respective rows of pixels can be approximately the same, thereby making the display luminance of the display panel uniform, so as to improve the display effect. At the same time, when the generation of sequentially-shifted gate driving signals is suspended without suspending the generation of sequentially-shifted light-emission control signals during the touch detection period, the timing of the light-emission control signal and the gate driving signal for the same row of pixels can be ensured, for example, in a case where the time length of a display frame is not changed, the preset timing relationship between the gate driving signal and light-emission control signal for the each row of pixels can be ensured by appropriately setting the leading amount of the starting point of inactive level of the light-emission control signal relative to the starting point of active level of the gate driving signal for the first row of pixels, therefore, the timing of the light-emission control signal and the gate driving signal for each row of pixels will not be in disorder.

Although the present invention has been disclosed by way of examples, it is not intended to limit the present invention. Anyone with general knowledge in the technical field can make some changes and refinements without departing from the spirit and scope of the present invention. Therefore, the scope of protection of the present invention shall be determined as defined by the appended claims.

What is claimed is:

1. A method for driving an OLED touch-and-display device, the OLED touch-and-display device including a display panel including a plurality of rows of pixels, a plurality of gate driving lines (GL), and a plurality of light-emission control lines (EM) in one-to-one correspondence, wherein the method comprises:
setting a first light-emission control signal applied to a light-emission control line corresponding to a first row of pixels to inactive level at a preset time point, and maintaining the first light-emission control signal at inactive level;
setting a first gate driving signal applied to a gate driving line corresponding to the first row of pixels to active level, after a first preset time length elapses from the preset time point;
generating, based on a first clock signal and from the first gate driving signal, sequentially-shifted gate driving signals;
generating, based on a second clock signal and from the first light emission control signal, sequentially-shifted light-emission control signals, wherein, a first clock cycle of the first clock signal is less than a second clock cycle of the second clock signal; and
during a touch detection period, suspending generation of the sequentially-shifted gate driving signals without suspending generation of the sequentially-shifted light-emission control signals, wherein each display frame is divided into at least one display period and at least one touch detection period which are alternated,
wherein a time length of the first clock cycle ($T_{GCK}$) and a time length of the second clock cycle ($T_{EMCK}$) satisfy the following relationship:

$$T_{GCK}=T_{EMCK} \times DP/(DP+TP)$$

where, DP is the time length of one display period and TP is the time length of one touch detection period.

2. The method according to claim 1, wherein, during a period when the first gate driving signal is of active level, maintaining the first light-emission control signal at inactive level.

3. The driving method according to claim 1, wherein each gate driving signal is a pulse signal including one active level pulse in each display frame, and each light-emission control signal is a pulse signal including at least one inactive level pulse in each display frame.

4. The method according to claim 3, wherein one display period and its adjacent touch detection period serve as one time unit, a first time unit of each display frame lasts for M second clock cycles, M is an integer greater than or equal to 1,
wherein, a starting point of inactive level pulse or a first inactive level pulse of a light-emission control signal applied to a light-emission control line corresponding to the M-th row of pixels is leading a starting point of active level pulse of a gate driving signal applied to a gate driving line corresponding to the M-th row of pixels, a leading amount being a second preset time length,
wherein, the second preset time length is ensured to be greater than or equal to a predetermined time length threshold $Z_0$ by setting the first preset time length.

5. The method according to claim 4, wherein the first preset time length is determined according to the time length of each touch detection period included in the first time unit.

6. The method according to claim 4, wherein a minimum value ($Z_{min}$) of the first preset time length is determined according to the following formula:

$$Z_{min}=TP+Z_0$$

where, TP is the time length of one touch detection period, and $Z_0$ is the predetermined time length threshold, which indicates a minimum time length value that a starting point of first inactive level pulse of a light-emission control signal applied to a light-emission control line corresponding to each row of pixels is leading the starting point of active level pulse of a gate driving signal applied to a gate driving line corresponding to the row of pixels.

7. The method according to claim 1, wherein the OLED touch display device further includes a touch sensitive layer comprising a plurality of touch sensitive cells, wherein each display frame is divided into a plurality of display periods and a plurality of touch detection periods which are alternated,
wherein, the method further comprises:
completing touch detection operation for at least a part of the plurality of touch sensitive cells within each touch detection period.

8. The method according to claim 1, wherein each display frame sequentially comprises a first display period, a first touch detection period, a second display period and a second touch detection period,
wherein, sequentially-shifted gate driving signals for a first number of rows of pixels are generated in the first display period, and wherein, sequentially-shifted gate driving signals for a second number of rows of pixels are generated in the second display period, the second number of rows of pixels being immediately after the first number of rows of pixels.

9. A driving circuit for a display panel in an OLED touch display device, the display panel including a plurality of rows of pixels, a plurality of gate driving lines (GL), and a plurality of light emission control lines (EM), which are in one-to-one correspondence, the driving circuit being designed to execute the method according to claim 1.

10. An OLED touch-and-display device includes:
a display panel including a plurality of rows of pixels, a plurality of gate drive lines (GL), and a plurality of light-emission control lines (EM), which are in one-to-one correspondence;
a touch sensitive layer and a touch controller; and
the driving circuit according to claim 9, which is used for driving the display panel.

11. A method for driving an OLED touch-and-display device, the OLED touch-and-display device including a display panel including a plurality of rows of pixels, a plurality of gate driving lines (GL), and a plurality of light-emission control lines (EM) in one-to-one correspondence, wherein the method comprises:
dividing each display frame into at least one display period and at least one touch detection period which are alternated;
during each display period, sequentially applying the sequentially-shifted gate driving signals to at least a part of gate driving lines of the plurality of gate driving lines based on a first clock signal (GCK), and sequentially applying the sequentially-shifted light-emission control signals to at least a part of light-emission control lines of the plurality of light-emission control lines based on a second clock signal (EMCK);
during each touch detection period, suspending generation of sequentially-shifted gate driving signals without suspending generation of sequentially-shifted light-emission control signals; and
during a period when a gate driving signal applied to a gate driving line corresponding to each row of pixels is of active level, maintaining a light-emission control signal applied to a light-emission control line corresponding to the row of pixels at inactive level,
wherein, each gate driving signal is a pulse signal including one active level pulse in each display frame, and each light-emission control signal is a pulse signal including at least one inactive level pulse in each display frame, wherein starting points of active level pulses of two gate driving signals applied to two adjacent gate driving lines differ by a time length of a first clock cycle of the first clock signal (GCK), and starting points of inactive level pulses of two light-emission control signals applied to two adjacent light-emission control lines differ by a time length of a second clock cycle of the second clock signal (EMCK), and the time length of the first clock cycle is smaller than the time length of the second clock cycle,
wherein the first clock cycle ($T_{GCK}$) and the second clock cycle ($T_{EMCK}$) satisfy the following relationship:

$$T_{GCK}=T_{EMCK}\times DP/(DP+TP)$$

where, DP is the time length of one display period and TP is the time length of one touch detection period.

12. The method according to claim 11, wherein, during a period when a gate driving signal applied to a gate driving line corresponding to each row of pixels is of active level, maintaining a light-emission control signal applied to a light-emission control line corresponding to the row of pixels at inactive level, comprises:
setting a first light-emission control signal applied to a light-emission control line corresponding to a first row of pixels to inactive level at a preset time point, and maintaining the first light-emission control signal at inactive level;

setting a first gate driving signal applied to a gate driving line corresponding to the first row of pixels to active level, after a first preset time length elapses from the preset time point; and during a period when the first gate driving signal is of active level, maintaining the first light-emission control signal at inactive level, wherein, the sequentially-shifted light-emission control signals are generated from the first light-emission control signal based on the second clock cycle, and the sequentially-shifted gate driving signals are generated from the first gate driving signal based on the first clock cycle.

13. The method according to claim 12, wherein one display period and its adjacent touch detection period serve as one time unit, a first time unit of each display frame lasts for M second clock cycles, M is an integer greater than or equal to 1, wherein, a starting point of inactive level pulse or a first inactive level pulse of a light-emission control signal applied to a light-emission control line corresponding to the M-th row of pixels is leading a starting point of active level pulse of a gate driving signal applied to a gate driving line corresponding to the M-th row of pixels, a leading amount being a second preset time length, wherein, the second preset time length is ensured to be greater than or equal to a predetermined time length threshold $Z_0$ by setting the first preset time length.

14. The method according to claim 13, wherein a minimum value ($Z_{min}$) of the first preset time length is determined according to the following formula:

$$Z_{min} = TP + Z_0$$

where, TP is the time length of one touch detection period, and $Z_0$ is the predetermined time length threshold, which indicates a minimum time length value that a starting point of first inactive level pulse of a light-emission control signal applied to a light-emission control line corresponding to each row of pixels is leading the starting point of active level pulse of a gate driving signal applied to a gate driving line corresponding to the row of pixels.

15. The method according to claim 13, wherein the first preset time length is determined according to the time length of each touch detection period included in the first time unit.

16. The method according to claim 11, wherein the OLED touch display device further includes a touch sensitive layer comprising a plurality of touch sensitive cells, wherein each display frame is divided into a plurality of display periods and touch detection periods which are alternated, wherein, the method further comprises:

completing touch detection operation for at least a part of the plurality of touch sensitive cells within each touch detection period.

17. The method according to claim 11, wherein each display frame sequentially comprises a first display period, a first touch detection period, a second display period and a second touch detection period, wherein, sequentially-shifted gate driving signals for a first number of rows of pixels are generated in the first display period, and wherein, sequentially-shifted gate driving signals for a second number of rows of pixels are generated in the second display period, the second number of rows of pixels being immediately after the first number of rows of pixels.

* * * * *